US012603451B2

(12) United States Patent
Ashibu

(10) Patent No.: US 12,603,451 B2
(45) Date of Patent: Apr. 14, 2026

(54) CONNECTOR HAVING PLUG AND RECEPTACLE

(71) Applicant: Japan Aviation Electronics Industry, Ltd., Tokyo (JP)

(72) Inventor: Kenta Ashibu, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 192 days.

(21) Appl. No.: 18/353,171

(22) Filed: Jul. 17, 2023

(65) Prior Publication Data

US 2024/0072478 A1 Feb. 29, 2024

(30) Foreign Application Priority Data

Aug. 29, 2022 (JP) ................................ 2022-135867

(51) Int. Cl.
*H01R 13/24* (2006.01)
*H01R 13/405* (2006.01)
*H01R 13/502* (2006.01)

(52) U.S. Cl.
CPC ..... *H01R 13/2492* (2013.01); *H01R 13/2414* (2013.01); *H01R 13/405* (2013.01); *H01R 13/502* (2013.01)

(58) Field of Classification Search
CPC ............ H01R 13/2492; H01R 13/2414; H01R 13/405; H01R 13/502; H01R 13/512;
(Continued)

(56) References Cited

U.S. PATENT DOCUMENTS 7,284,992 B2 * 10/2007 Becker .............. H01L 23/49838
257/E23.07
2001/0055917 A1 12/2001 Azuma
(Continued)

FOREIGN PATENT DOCUMENTS

JP 2001319718 A 11/2001
JP 3113410 U 9/2005
(Continued)

OTHER PUBLICATIONS

Notice of Refusal issued on Feb. 10, 2026 in the counterpart JP Patent Application No. 2022-135867, with Machine Translation.

*Primary Examiner* — Abdullah A Riyami
*Assistant Examiner* — Nader J Alhawamdeh
(74) *Attorney, Agent, or Firm* — Renner, Otto, Boisselle & Sklar, LLP

(57) ABSTRACT

Provided is a connector with enhanced contact reliability. A connector includes a plug and a receptacle connected to the plug. The plug includes a plug main body having a plug surface including a first plug region, a second plug region, and a third plug region, a plurality of projecting parts including a first projecting part and a second projecting part projecting from the plug surface, and a plurality of plug terminals projecting lower than the projecting parts from the plug surface. The receptacle includes a receptacle main body having a receptacle surface including a first receptacle region, a second receptacle region, and a third receptacle region, where a first groove and a second groove are formed on the receptacle surface, and a plurality of receptacle terminals.

13 Claims, 17 Drawing Sheets

(58) Field of Classification Search
CPC H01R 13/5202; H01R 31/065; H01R 12/716; H01R 12/73; H01R 13/02; H01R 13/22; H01R 13/40; H01R 13/639; H01R 12/71
See application file for complete search history.

(56) References Cited

U.S. PATENT DOCUMENTS

| | | | | |
|---|---|---|---|---|
| 2014/0017957 | A1 | 1/2014 | Horchler et al. | |
| 2017/0125946 | A1 | 5/2017 | Horchler et al. | |
| 2024/0072478 | A1* | 2/2024 | Ashibu | H01R 12/73 |
| 2024/0145957 | A1* | 5/2024 | Hashiguchi | H01R 12/52 |
| 2024/0178593 | A1* | 5/2024 | Ashibu | H01R 12/716 |
| 2025/0183569 | A1* | 6/2025 | Ashibu | H01R 12/7076 |

FOREIGN PATENT DOCUMENTS

| | | | | |
|---|---|---|---|---|
| JP | 6615845 | B2 | | 12/2019 |
| JP | 2020205211 | A | * | 12/2020 |

* cited by examiner

CONNECTOR HAVING PLUG AND RECEPTACLE

INCORPORATION BY REFERENCE

This application is based upon and claims the benefit of priority from Japanese patent application No. 2022-135867, filed on Aug. 29, 2022, the disclosure of which is incorporated herein in its entirety by reference.

BACKGROUND

The present disclosure relates to a connector.

FIG. 21 is an illustration of plug terminals 1002 arranged in an array on a plug surface 1001 and receptacle terminals 2002 arranged in an array on a receptacle surface 2001 in a related connector including a plug 1000 and a receptacle 2000. As shown in FIG. 21, the plug terminals 1002 and the receptacle terminals 2002 project from the plug surface 1001 and the receptacle surface 2001, respectively.

SUMMARY

In the above-described connector, the plug terminals 1002 and the receptacle terminals 2002 need to have springiness. Therefore, the strength of the plug terminals 1002 and the receptacle terminals 2002 is not so high. In addition, the plug terminals 1002 and the receptacle terminals 2002 project from the plug surface 1001 and the receptacle surface 2001, respectively. Thus, their toughness is low. Therefore, when a mating position is out of alignment between the plug 1000 and the receptacle 2000, there is a concern that that the plug terminals 1002 and the receptacle terminals 2002 can interfere with a plug main body and a receptacle main body on the other side and be broken down. In light of this, the above-described related connector is incapable of enhancing the contact reliability.

The present disclosure has been accomplished to solve the above problems and an object of the present disclosure is thus to provide a connector with enhanced contact reliability.

According to an aspect of the present disclosure, there is provided a connector including a plug and a receptacle, wherein the plug includes a plug main body having a plug surface in a flat plate shape including a first plug region, a second plug region, and a third plug region, a plurality of projecting parts including a first projecting part and a second projecting part projecting from the plug surface, and a plurality of plug terminals projecting lower than the projecting parts from the plug surface, the receptacle includes a receptacle main body having a receptacle surface in a flat plate shape including a first receptacle region, a second receptacle region, and a third receptacle region, where a first groove and a second groove are formed on the receptacle surface, and a plurality of receptacle terminals respectively disposed inside a plurality of holes formed on the receptacle surface, the first projecting part divides the first plug region and the second plug region, the second projecting part divides the second plug region and the third plug region, the first groove divides the first receptacle region and the second receptacle region, the second groove divides the second receptacle region and the third receptacle region, and when the first projecting part and the second projecting part are inserted into the first groove and the second groove, respectively, plug terminals in the first plug region, the second plug region, and the third plug region are connected to receptacle terminals in the first receptacle region, the second receptacle region, and the third receptacle region.

In the above-described connector, the plug surface may further include a fourth plug region, the plurality of projecting parts may further include a third projecting part and a fourth projecting part projecting from the plug surface, the receptacle surface may further include a fourth receptacle region, a third groove and a fourth groove may be further formed in the receptacle main body, the third projecting part may divide the third plug region and the fourth plug region, the fourth projecting part may divide the first plug region and the fourth plug region, the third groove may divide the third receptacle region and the fourth receptacle region, the fourth groove may divide the first receptacle region and the fourth receptacle region, and when the third projecting part and the fourth projecting part are further inserted into the third groove and the fourth groove, respectively, plug terminals in the fourth plug region may be connected to receptacle terminals in the fourth receptacle region.

In the above-described connector, the first projecting part and the third projecting part may extend in one direction on the plug surface, the second projecting part and the fourth projecting part may extend in another direction intersecting with the one direction on the plug surface, and when the receptacle surface and the plug surface are opposed to each other, the first groove and the third groove may extend in the one direction on the receptacle surface, and the second groove and the fourth groove may extend in the another direction on the receptacle surface.

In the above-described connector, the plug surface may further include a first center region, the first projecting part and the third projecting part may be arranged in line with the first center region interposed therebetween on the plug surface, the second projecting part and the fourth projecting part may be arranged in line with the first center region interposed therebetween on the plug surface, the receptacle surface may further include a second center region, the first groove and the third groove may be arranged in line with the second center region interposed therebetween on the receptacle surface, and the second groove and the fourth groove may be arranged in line with the second center region interposed therebetween on the receptacle surface.

In the above-described connector, the plug terminals may have lower elasticity than the receptacle terminals, and distal ends of the receptacle terminals may be located inside the holes.

In the above-described connector, the plug further may further include a plug frame projecting from the plug surface and surrounding the first plug region, the second plug region, the third plug region, and the fourth plug region, and when the first projecting part, the second projecting part, the third projecting part, and the fourth projecting part are inserted into the first groove, the second groove, the third groove, and the fourth groove, respectively, the receptacle may be mated with an inside space surrounded by the plug frame.

In the above-described connector, the plug frame may be in a rectangular frame shape and includes a first frame part, a second frame part, a third frame part, and a fourth frame part, the first frame part and the third frame part may extend in another direction intersecting with one direction on the plug surface, and the second frame part and the fourth frame part may extend in the one direction on the plug surface.

In the above-described connector, the plug may further include a plug shell, the plug shell including a first projecting reinforcement part formed in the first projecting part, a second projecting reinforcement part formed in the second projecting part, a third projecting reinforcement part formed in the third projecting part, a fourth projecting reinforcement part formed in the fourth projecting part, and a shell part covering side surfaces of the plug main body, projecting from the plug surface, surrounding the first plug region, the second plug region, the third plug region and the fourth plug region, and connected to the first projecting reinforcement part, the second projecting reinforcement part, the third projecting reinforcement part, and the fourth projecting reinforcement part, the receptacle may further include a receptacle shell, the receptacle shell including a first groove reinforcement part formed on an inner wall of the first groove, a second groove reinforcement part formed on an inner wall of the second groove, a third groove reinforcement part formed on an inner wall of the third groove, a fourth groove reinforcement part formed on an inner wall of the fourth groove, and a shell part covering side surfaces of the receptacle main body and connected to the first groove reinforcement part, the second groove reinforcement part, the third groove reinforcement part, and the fourth groove reinforcement part, and when the first projecting part, the second projecting part, the third projecting part and the fourth projecting part are inserted into the first groove, the second groove, the third groove and the fourth groove, respectively, the first projecting reinforcement part, the second projecting reinforcement part, the third projecting reinforcement part, and the fourth projecting reinforcement part may be opposed to the first groove reinforcement part, the second groove reinforcement part, the third groove reinforcement part, and the fourth groove reinforcement part, and the shell part in the plug shell may come into contact with the shell part in the receptacle shell.

In the above-described connector, the first projecting part may extend in one direction on the plug surface, the second projecting part may extend in another direction intersecting with the one direction on the plug surface, and when the receptacle surface and the plug surface are opposed to each other, the first groove may extend in the one direction on the receptacle surface, and the second groove may extend in the another direction on the receptacle surface.

In the above-described connector, the plug surface may further include a first center region, the first projecting part may be arranged in line with the first center region on the plug surface, the second projecting part may be arranged in line with the first center region on the plug surface, the receptacle surface may further include a second center region, the first groove may be arranged in line with the second center region on the receptacle surface, and the second groove may be arranged in line with the second center region on the receptacle surface.

In the above-described connector, the plug may further include a plug frame projecting from the plug surface and surrounding the first plug region, the second plug region, and the third plug region, and when the first projecting part and the second projecting part are inserted into the first groove and the second groove, respectively, the receptacle may be mated with an inside space surrounded by the plug frame.

In the above-described connector, the plug frame may be in a rectangular frame shape and includes a first frame part, a second frame part, a third frame part, and a fourth frame part, the first frame part and the third frame part may extend in another direction intersecting with one direction on the plug surface, and the second frame part and the fourth frame part may extend in the one direction on the plug surface.

In the above-described connector, the plug may further include a plug shell, the plug shell including a first projecting reinforcement part formed in the first projecting part, a second projecting reinforcement part formed in the second projecting part, and a shell part covering side surfaces of the plug main body, projecting from the plug surface, surrounding the first plug region, the second plug region, and the third plug region, and connected to the first projecting reinforcement part and the second projecting reinforcement part, the receptacle may further include a receptacle shell, the receptacle shell including a first groove reinforcement part formed on an inner wall of the first groove, a second groove reinforcement part formed on an inner wall of the second groove, and a shell part covering side surfaces of the receptacle main body and connected to the first groove reinforcement part and the second groove reinforcement part, and when the first projecting part and the second projecting part are inserted into the first groove and the second groove, respectively, the first projecting reinforcement part and the second projecting reinforcement part may be opposed to the first groove reinforcement part and the second groove reinforcement part, and the shell part in the plug shell may come into contact with the shell part in the receptacle shell.

According to the present disclosure, a connector with enhanced contact reliability is provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

A specific structure of the present embodiments will be described hereinbelow with reference to the drawings. The description provided hereinbelow merely illustrates preferred embodiments of the present disclosure, and the present disclosure is not limited to the below-described embodiments. In the following description, the identical reference symbols denote substantially identical elements.

First Embodiment

Figure 1:
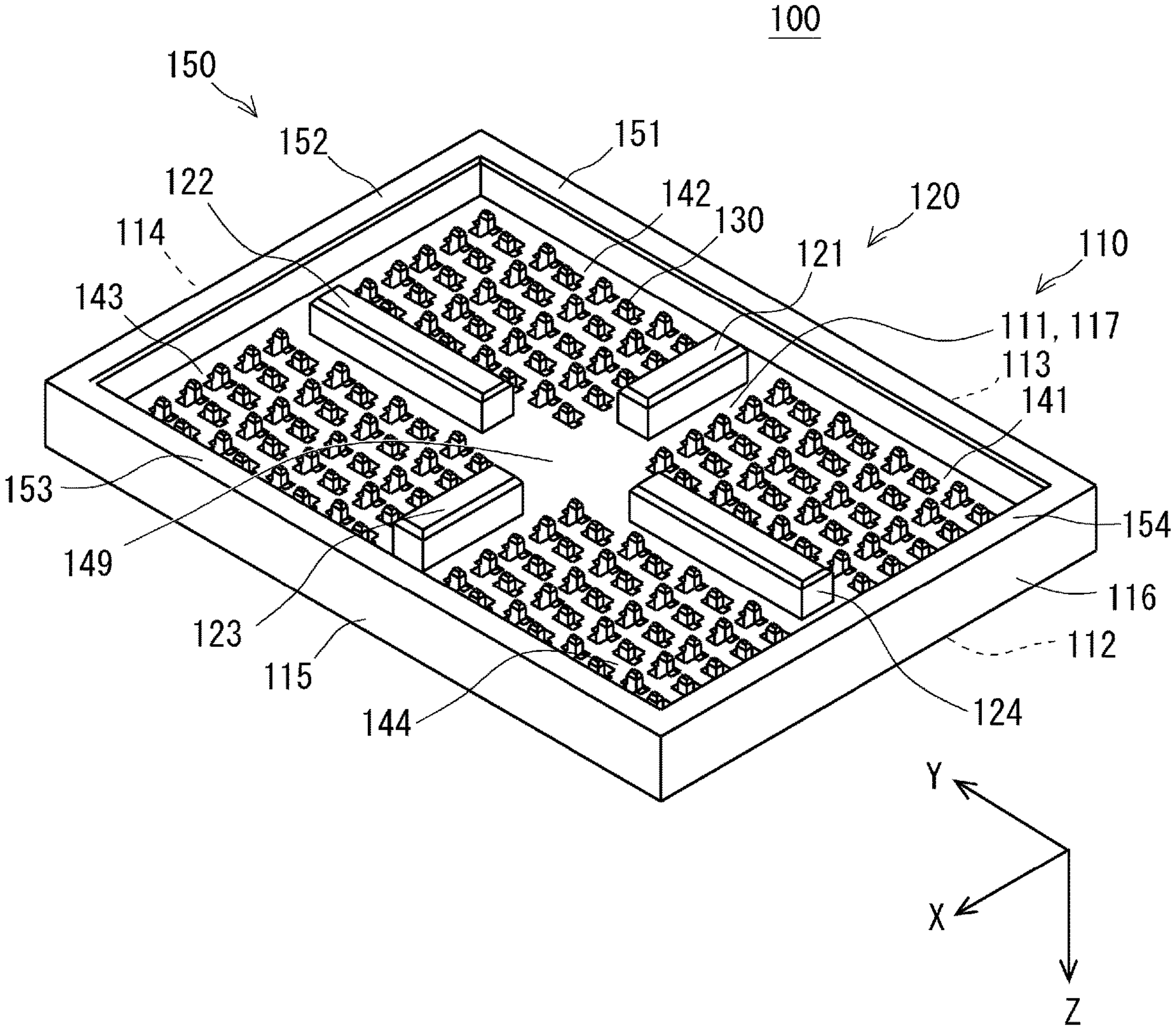
FIG. 1 is a perspective view illustrating a plug in a connector according to a first embodiment.
Figure 2:
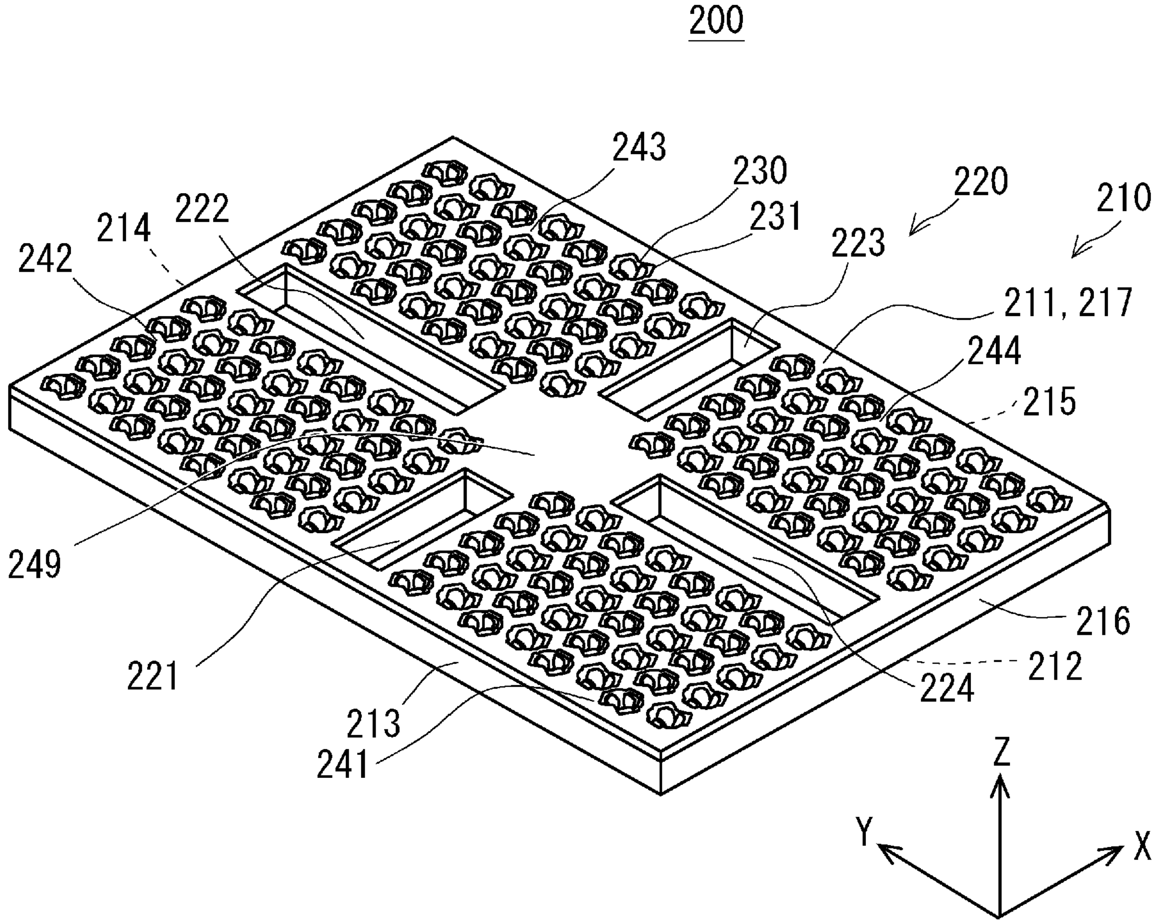
FIG. 2 is a perspective view illustrating a receptacle in the connector according to the first embodiment.
Figure 3:
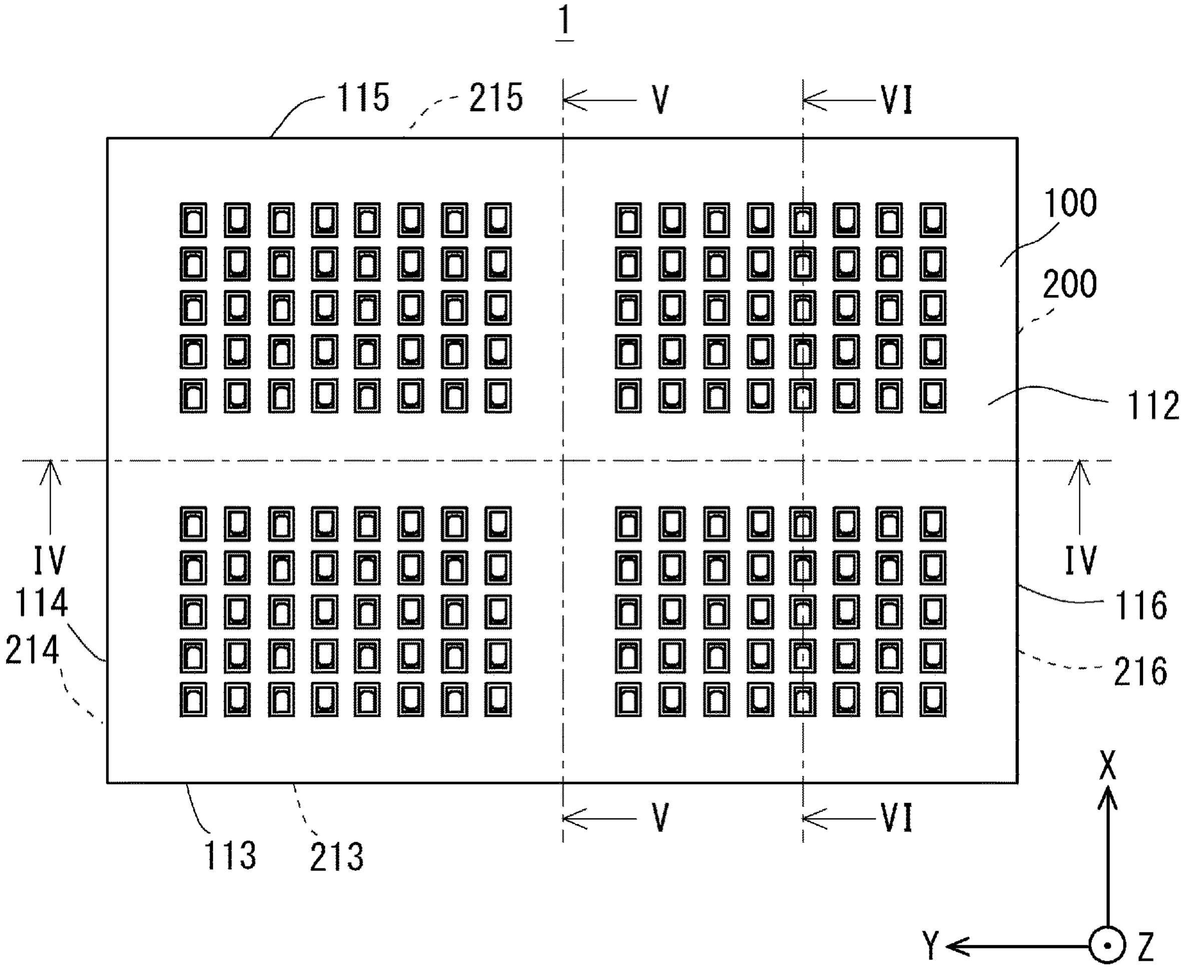
FIG. 3 is a top view illustrating the state where the plug and the receptacle are mated in the connector according to the first embodiment.
Figure 4:
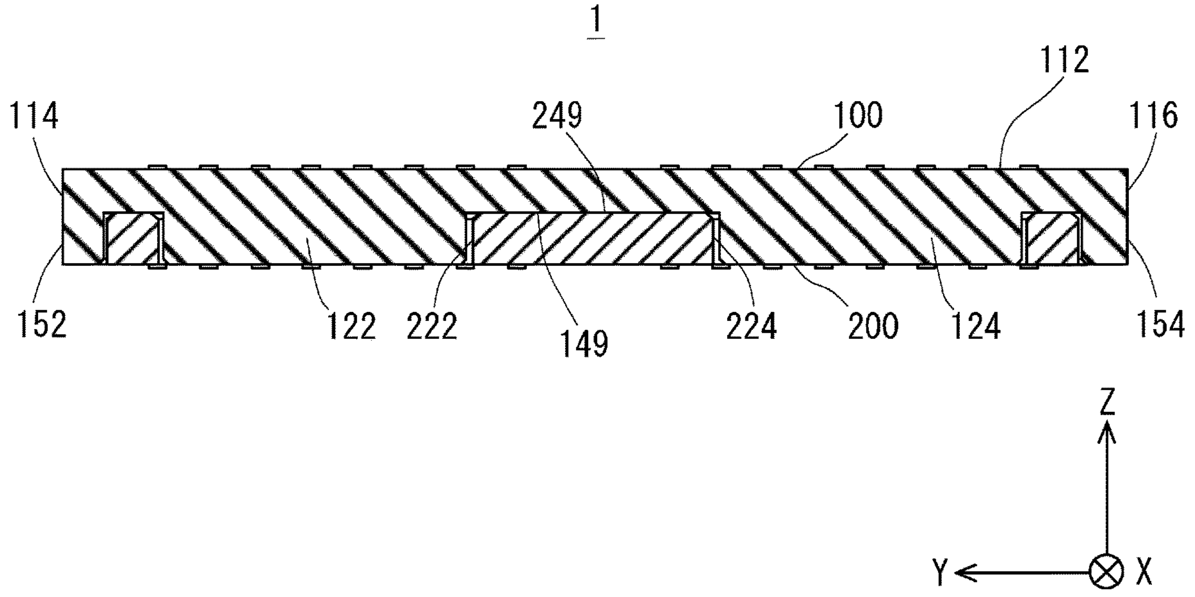
FIG. 4 is a cross-sectional view along line IV-IV in FIG. 3 illustrating the state where the plug and the receptacle are mated in the connector according to the first embodiment.
Figure 5:
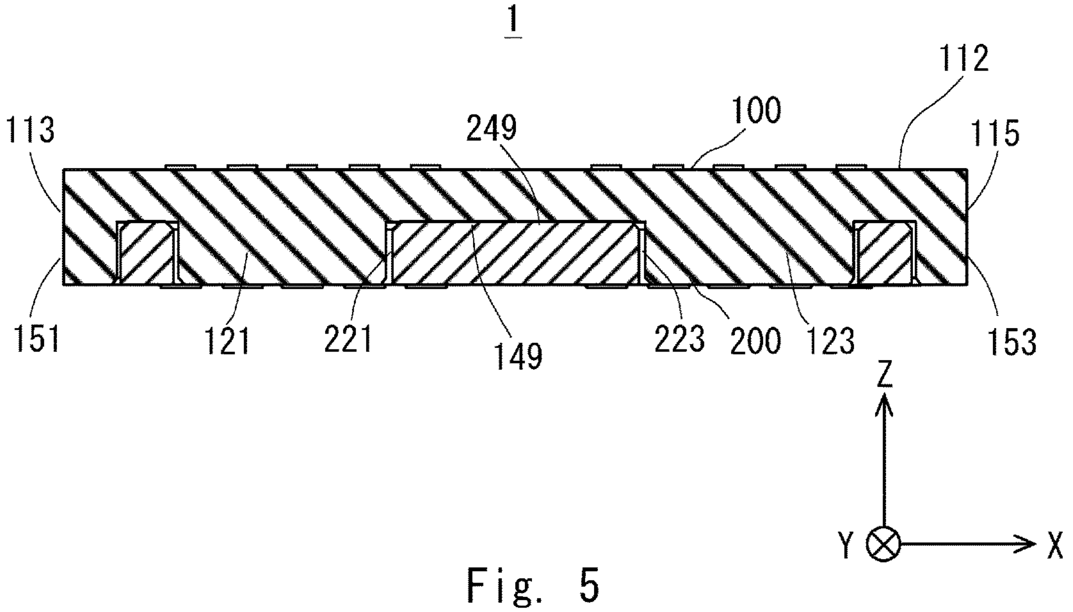
FIG. 5 is a cross-sectional view along line V-V in FIG. 3 illustrating the state where the plug and the receptacle are mated in the connector according to the first embodiment.
Figure 6:
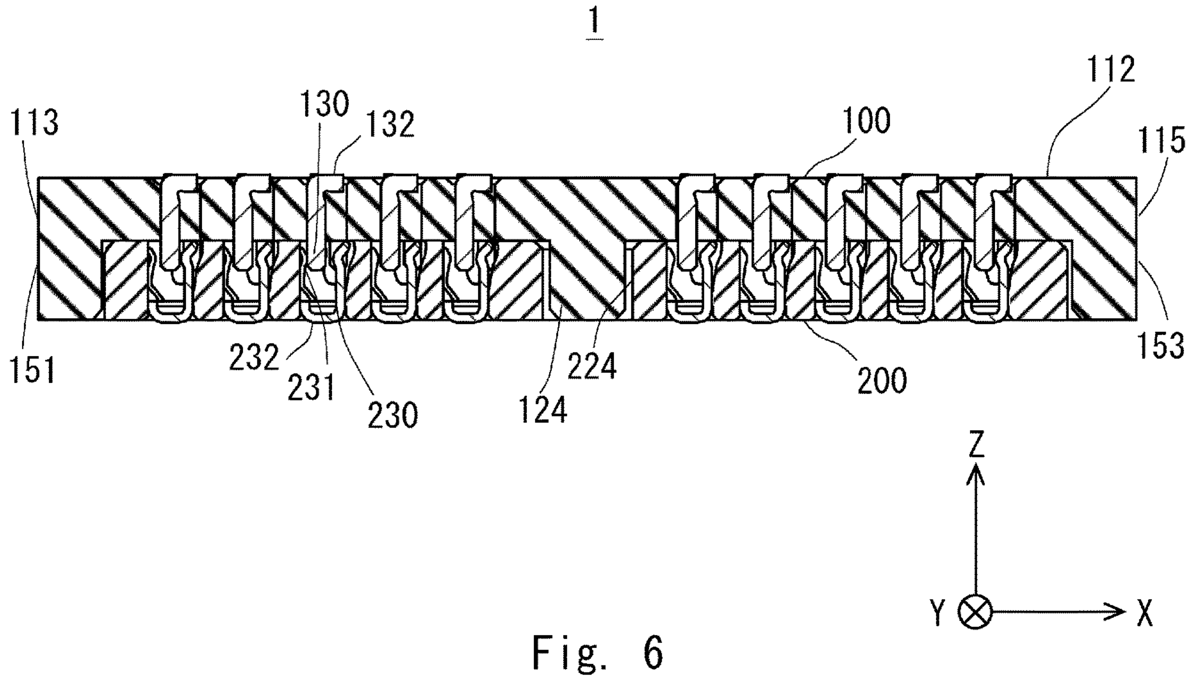
FIG. 6 is a cross-sectional view along line VI-VI in FIG. 3 illustrating the state where the plug and the receptacle are mated in the connector according to the first embodiment.

A connector according to a first embodiment will be described hereinafter. FIG. 1 is a perspective view illustrating a plug in the connector according to the first embodiment. FIG. 2 is a perspective view illustrating a receptacle in the connector according to the first embodiment. FIG. 3 is a top view illustrating the state where the plug and the receptacle are mated in the connector according to the first embodiment. FIG. 4 is a cross-sectional view along line IV-IV in FIG. 3 illustrating the state where the plug and the receptacle are mated in the connector according to the first embodiment. FIG. 5 is a cross-sectional view along line V-V in FIG. 3 illustrating the state where the plug and the receptacle are mated in the connector according to the first embodiment. FIG. 6 is a cross-sectional view along line VI-VI in FIG. 3 illustrating the state where the plug and the receptacle are mated in the connector according to the first embodiment;

As shown in FIGS. 1 to 6, a connector 1 includes a plug 100 and a receptacle 200. The connector 1 connects the plug 100 and the receptacle 200 and thereby produces electrical continuity between the plug 100 and the receptacle 200. Further, the connector 1 connects and disconnects the plug 100 and the receptacle 200 and thereby controls the current flow. Note that the connector 1 is not limited to one capable of connecting and disconnecting the plug 100 and the receptacle 200, and it may be used for a connection structure in which the plug 100 and the receptacle 200 are fixed by screwing or the like and the plug 100 and the receptacle 200 are kept connected without being designed to be disconnected.

An xyz Cartesian coordinate system is introduced for the convenience of describing the connector 1. When the plug 100 and the receptacle 200 are opposed and connected to each other, a direction in which the plug 100 and the receptacle 200 are opposed is a z axis direction. An orientation directed from the receptacle 200 to the plug 100 is an orientation in a +z direction. Two directions perpendicular to the z axis direction are an x axis direction and a y axis direction.

The plug 100 includes a plug main body 110, a plurality of projecting parts 120, and a plurality of plug terminals 130. Each structure of the plug 100 will be described hereinafter.

The plug main body 110 is in a rectangular plate shape, for example, and has two plate surfaces 111 and 112 opposed to each other, two side surfaces 113 and 115 opposed to each other, and two side surfaces 114 and 116 opposed to each other. Each of the side surfaces 113 to 116 is connected to each of the plate surfaces 111 and 112. A material of the plug main body 110 contains an insulator such as resin, for example. Note that a material of the plug main body 110 is not limited to an insulator such as resin as long as it is not electrically short-circuited to the plurality of plug terminals 130, and it may be metal or the like covered with an insulating film.

The plate surface 111 is the plate surface 111 on the −z axis direction side of the plug main body 110. The plate surface 111 serves as a plug surface 117 opposed to the receptacle 200. Thus, the plug main body 110 has the plug surface 117 in a flat plate shape. The plug surface 117 serves as a mating reference surface when mated with the receptacle 200.

The plug surface 117 includes a first plug region 141, a second plug region 142, a third plug region 143, and a fourth plug region 144. The first plug region 141 is disposed on the −y axis direction side of the second plug region 142. The first plug region 141 is disposed on the −x axis direction side of the fourth plug region 144. Further, the second plug region 142 is disposed on the +y axis direction side of the first plug region 141. The second plug region 142 is disposed on the −x axis direction side of the third plug region 143. Further, the third plug region 143 is disposed on the +x axis direction side of the second plug region 142. The third plug region 143 is disposed on the +y axis direction side of the fourth plug region 144. Further, the fourth plug region 144 is disposed on the +x axis direction side of the first plug region 141. The fourth plug region 144 is disposed on the −y axis direction side of the third plug region 143.

The plug surface 117 may include a first center region 149. The first center region 149 is surrounded by the first plug region 141, the second plug region 142, the third plug region 143, and the fourth plug region 144. To be specific, the first center region 149 is disposed between the first plug region 141 and the third plug region 143. Further, the first center region 149 is disposed between the second plug region 142 and the fourth plug region 144.

The side surfaces 113 and 115 are opposed to each other in the x axis direction, and the side surfaces 114 and 116 are opposed to each other in the y axis direction. Note that the shape of the plug main body 110 is not limited to a rectangular plate shape as long as it has the plug surface 117 opposed to the receptacle 200, and it may have a hemispherical shape whose cross-section is the plug surface 117, for example.

The plurality of projecting parts 120 project from the plug surface 117. The plurality of projecting parts 120 project in the −z axis direction from the plug surface 117. A material of the plurality of projecting parts 120 may contain the same material as that of the plug main body 110. For example, a material of the plurality of projecting parts 120 may contain an insulator such as resin. Note that a material of the plurality of projecting parts 120 may contain metal. The plurality of projecting parts 120 include a first projecting part 121, a second projecting part 122, a third projecting part 123, and a fourth projecting part 124. The height of each projecting parts 120 from the plug surface 117, i.e., the length of each projecting parts 120 in the z axis direction, is preferably the same. Note that "the length of each projecting parts 120 in the z axis direction is the same" means that the length is the same within a range including an unavoidable error. In the following description, "the same length" is used in a similar way. The length of each projecting parts 120 projecting from the plug surface 117 is longer than the length of the plug terminal 130 projecting from the plug surface 117.

Each of the plurality of projecting parts 120 is in a rectangular parallelepiped shape, for example. The first projecting part 121 and the third projecting part 123 have a rectangular parallelepiped shape extending in the x axis direction, for example. Thus, the first projecting part 121 and the third projecting part 123 extend in the x axis direction on the plug surface 117. The second projecting part 122 and the fourth projecting part 124 have a rectangular parallelepiped shape extending in the y axis direction, for example. Thus, the second projecting part 122 and the fourth projecting part 124 extend in the y axis direction intersecting with the x axis direction on the plug surface 117. Note that the shape of each projecting part 120 is not limited to a rectangular parallelepiped shape, and it may be a cylindrical shape, or a columnar shape with a base being an ellipse extending in the x axis direction or in the y axis direction.

Further, the first projecting part 121 and the third projecting part 123 may extend in a direction deviated from the x axis direction. For example, the first projecting part 121 and the third projecting part 123 may extend in a direction rotated from the x axis in the same direction of rotation around the z axis as the axis of rotation when viewed from the −z axis direction. In this case, the first projecting part 121 and the third projecting part 123 are in the shape of "//" where two projecting parts 120 are arranged obliquely, for example, when viewed from the −z axis direction. Further, the first projecting part 121 and the third projecting part 123 may extend in a direction rotated from the x axis in different directions of rotation. In this case, the first projecting part 121 and the third projecting part 123 are in the shape of ">" where two projecting parts 120 facing in different directions are arranged, for example, when viewed from the −z axis direction.

The second projecting part 122 and the fourth projecting part 124 may extend in a direction deviated from the y axis direction. For example, the second projecting part 122 and the fourth projecting part 124 may extend in a direction rotated from the y axis in the same direction of rotation around the z axis as the axis of rotation when viewed from the −z axis direction. In this case, the second projecting part 122 and the fourth projecting part 124 are in the shape of "//" where two projecting parts 120 are arranged obliquely, for example, when viewed from the −z axis direction. Further, the second projecting part 122 and the fourth projecting part 124 may extend in a direction rotated from the y axis in different directions of rotation. In this case, the second projecting part 122 and the fourth projecting part 124 are in the shape of ">" where two projecting parts 120 facing in different directions are arranged, for example, when viewed from the −z axis direction.

The direction in which the second projecting part 122 and the fourth projecting part 124 extend is not limited to a direction perpendicular to the direction in which the first projecting part 121 and the third projecting part 123 extend as long as it is a direction intersecting with the direction in which the first projecting part 121 and the third projecting part 123 extend.

The first projecting part 121 is disposed between the first plug region 141 and the second plug region 142. Thus, the first projecting part 121 divides the first plug region 141 and the second plug region 142. The first projecting part 121 divides the first plug region 141 from the second plug region 142. The second projecting part 122 is disposed between the second plug region 142 and the third plug region 143. Thus, the second projecting part 122 divides the second plug region 142 and the third plug region 143. The second projecting part 122 divides the second plug region 142 from the third plug region 143. The third projecting part 123 is disposed between the third plug region 143 and the fourth plug region 144. Thus, the third projecting part 123 divides the third plug region 143 and the fourth plug region 144. The third projecting part 123 divides the third plug region 143 from the fourth plug region 144. The fourth projecting part 124 is disposed between the first plug region 141 and the fourth plug region 144. Thus, the fourth projecting part 124 divides the first plug region 141 and the fourth plug region 144. The fourth projecting part 124 divides the first plug region 141 from the fourth plug region 144.

The first projecting part 121 and the third projecting part 123 are adjacent in the x axis direction. For example, the first projecting part 121 is disposed on the −x axis direction side of the third projecting part 123. The first projecting part 121 and the third projecting part 123 are arranged in the x axis direction with the first center region 149 interposed therebetween on the plug surface 117. The second projecting part 122 and the fourth projecting part 124 are adjacent in the y axis direction. For example, the second projecting part 122 is disposed on the +y axis direction side of the fourth projecting part 124. The second projecting part 122 and the fourth projecting part 124 are arranged in the y axis direction with the first center region 149 interposed therebetween on the plug surface 117.

The plug 100 may further include a plug frame 150 in a frame shape. The plug frame 150 projects from the plug surface 117. The plug frame 150 projects in the −z axis direction from the plug surface 117. A material of the plug frame 150 may contain the same material as that of the plug main body 110. For example, a material of the plug frame 150 may contain an insulator such as resin. Note that a material of the plug frame 150 may contain metal. The plug frame 150 surrounds the first plug region 141, the second plug region 142, the third plug region 143, and the fourth plug region 144.

The plug frame 150 is in a rectangular frame shape, for example. The plug frame 150 includes a first frame part 151, a second frame part 152, a third frame part 153, and a fourth frame part 154. The first frame part 151 is a part on the −x axis direction side of the plug frame 150. The second frame part 152 is a part on the +y axis direction side of the plug frame 150. The third frame part 153 is a part on the +x axis direction side of the plug frame 150. The fourth frame part 154 is a part on the −y axis direction side of the plug frame 150.

The first frame part 151 and the third frame part 153 extend in the y axis direction, for example. The second frame part 152 and the fourth frame part 154 extend in the x axis direction. Ends of the first frame part 151 are connected to the second frame part 152 and the fourth frame part 154, respectively. Ends of the second frame part 152 are connected to the first frame part 151 and the third frame part 153, respectively. Ends of the third frame part 153 are connected to the second frame part 152 and the fourth frame part 154, respectively. Ends of the fourth frame part 154 are connected to the first frame part 151 and the third frame part 153, respectively.

The height of each frame part of the plug frame 150 from the plug surface 117, i.e., the length of each frame part in the z axis direction, is preferably the same. The length of each frame part projecting from the plug surface 117 is longer than the length of the plug terminal 130 projecting from the plug surface 117. The length of each frame part projecting from the plug surface 117 may be the same as the length of each projecting part 120 projecting from the plug surface 117.

Figure 7:
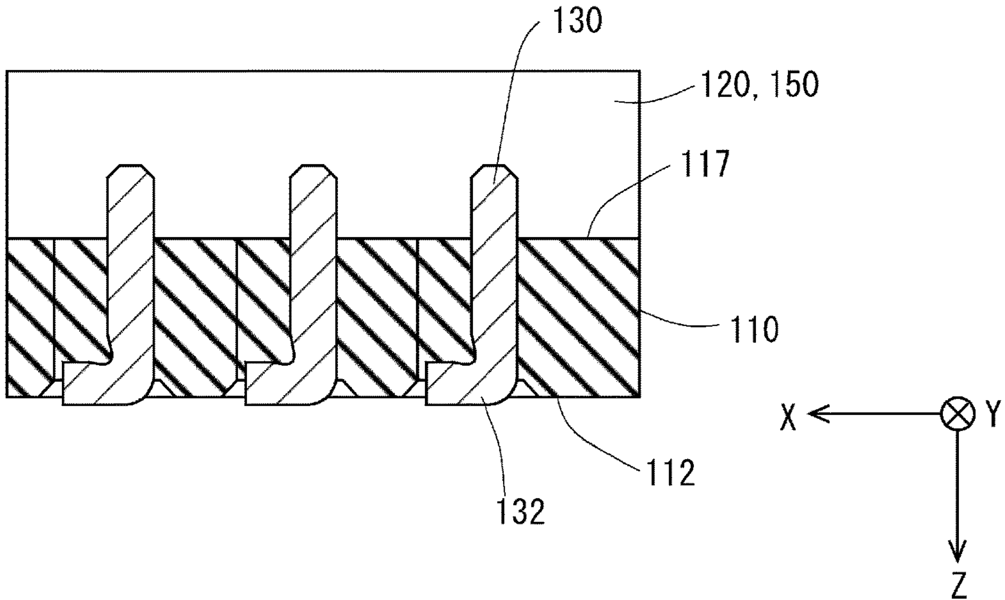
FIG. 7 is an enlarged cross-sectional view illustrating plug terminals of the plug in the connector according to the first embodiment.

FIG. 7 is an enlarged cross-sectional view illustrating the plug terminal 130 of the plug 100 in the connector 1 according to the first embodiment. As shown in FIGS. 1, 6 and 7, the plurality of plug terminals 130 project from the plug surface 117. The plurality of plug terminals 130 project in the −z axis direction from the plug surface 117. Each plug terminal 130 projects lower than each projecting part 120 and the plug frame 150 from the plug surface 117. Each plug terminal 130 projects less from the plug surface than each projecting part 120 and the plug frame 150 do. To be specific, the height of each plug terminal 130 from the plug surface 117, i.e., the length of a part of each plug terminal 130 projecting from the plug surface 117, is shorter than the length of each projecting part 120 in the z axis direction and the length of the plug frame 150 in the z axis direction.

The plug terminals 130 may be in an L shape having a part extending in the z axis direction and a part extending in the x axis or y axis direction. Since a part of each plug terminal 130 extending in the x axis or y axis direction is fixed to the plug main body 110, the plug terminal 130 is firmly fixed. The plug terminals 130 preferably have springiness. The elasticity of the plug terminals 130 is lower than the elasticity of receptacle terminals 230. An end part 132 of each plug terminal 130 on the +z axis direction side is exposed at the plate surface 112. The plug terminals 130 connect to the receptacle terminals and thereby produce continuity with the receptacle terminals. In the figures, reference symbols of several plug terminals 130 are omitted to avoid the complexity of the figures.

The plurality of plug terminals 130 are disposed in the first plug region 141, the second plug region 142, the third plug region 143, and the fourth plug region 144. The plurality of plug terminals 130 may be arranged in a matrix in each region of the first plug region 141, the second plug region 142, the third plug region 143, and the fourth plug region 144. The plurality of plug terminals 130 may be arranged in a matrix in the x axis direction and the y axis direction, or arranged in a matrix in directions deviated from the x axis direction and the y axis direction in each region.

Note that the arrangement of the plug terminals 130 in each region may be different from one another. The plug terminals 130 are not disposed in the first center region 149. Alternatively, the plug terminals 130 may be disposed in the first center region 149.

The receptacle 200 includes a receptacle main body 210 and a plurality of receptacle terminals 230. Each structure of the receptacle 200 will be described hereinafter.

The receptacle main body 210 is in a rectangular plate shape, for example, and has two plate surfaces 211 and 212 opposed to each other, two side surfaces 213 and 215 opposed to each other, and two side surfaces 214 and 216 opposed to each other. Each of the side surfaces 213 to 216 is connected to each of the plate surfaces 211 and 212. A material of the receptacle main body 210 contains an insulator such as resin, for example. Note that a material of the receptacle main body 210 is not limited to an insulator such as resin as long as it is not electrically short-circuited to the plurality of receptacle terminals 230, and it may be metal or the like covered with an insulating film.

The plate surface 211 is the plate surface 211 on the +z axis direction side of the receptacle main body 210. The plate surface 211 serves as a receptacle surface 217 opposed to the plug 100. Thus, the receptacle main body 210 has the receptacle surface 217 in a flat plate shape. The receptacle surface 217 serves as a mating reference surface when mated with the plug 100.

The receptacle surface 217 includes a first receptacle region 241, a second receptacle region 242, a third receptacle region 243, and a fourth receptacle region 244. The first receptacle region 241 is disposed on the −y axis direction side of the second receptacle region 242. The first receptacle region 241 is disposed on the −x axis direction side of the fourth receptacle region 244. The second receptacle region 242 is disposed on the +y axis direction side of the first receptacle region 241. The second receptacle region 242 is disposed on the −x axis direction side of the third receptacle region 243. The third receptacle region 243 is disposed on the +x axis direction side of the second receptacle region 242. The third receptacle region 243 is disposed on the +y axis direction side of the fourth receptacle region 244. The fourth receptacle region 244 is disposed on the +x axis direction side of the first receptacle region 241. The fourth receptacle region 244 is disposed on the −y axis direction side of the third receptacle region 243.

The receptacle surface 217 may include a second center region 249. The second center region 249 is surrounded by the first receptacle region 241, the second receptacle region 242, the third receptacle region 243, and the fourth receptacle region 244. To be specific, the second center region 249 is disposed between the first receptacle region 241 and the third receptacle region 243. Further, the second center region 249 is disposed between the second receptacle region 242 and the fourth receptacle region 244.

The side surfaces 213 and 215 are opposed to each other in the x axis direction, and the side surfaces 214 and 216 are opposed to each other in the y axis direction. Note that the shape of the receptacle main body 210 is not limited to a rectangular plate shape as long as it has the receptacle surface 217 opposed to the plug 100, and it may have a hemispherical shape whose cross-section is the receptacle surface 217, for example.

In the receptacle main body 210, the receptacle surface 217 has a plurality of grooves 220. The plurality of grooves 220 may penetrate the receptacle surface 217 of the receptacle main body 210 and reach the plate surface 212 on the back side. The plurality of grooves 220 include a first groove 221, a second groove 222, a third groove 223, and a fourth groove 224. The plurality of grooves 220 may be formed with a predetermined depth below the receptacle surface 217 of the receptacle main body 210. In this case, the depth of each groove 220, i.e., the length of each groove 220 from the receptacle surface 217 in the z axis direction, is preferably the same.

An internal space of each groove 220 is in a rectangular parallelepiped shape, for example. Internal spaces of the first groove 221 and the third groove 223 have a rectangular parallelepiped shape extending in the x axis direction, for example. Thus, the first groove 221 and the third groove 223 extend in the x axis direction on the receptacle surface 217.

Internal spaces of the second groove 222 and the fourth groove 224 have a rectangular parallelepiped shape extending in the y axis direction, for example. Thus, the second groove 222 and the fourth groove 224 extend in the y axis direction intersecting with the x axis direction on the receptacle surface 217. Note that the internal shape of each groove 220 is not limited to a rectangular parallelepiped shape, and it may be a cylindrical shape, or a columnar shape with a base being an ellipse extending in the x axis direction or in the y axis direction.

Further, the first groove 221 and the third groove 223 may extend in a direction deviated from the x axis direction. For example, the first groove 221 and the third groove 223 may extend in a direction rotated from the x axis in the same direction of rotation around the z axis as the axis of rotation when viewed from the +z axis direction. In this case, the first groove 221 and the third groove 223 are in the shape of "//" where two grooves 220 are arranged obliquely, for example, when viewed from the +z axis direction. Further, the first groove 221 and the third groove 223 may extend in a direction rotated from the x axis in different directions of rotation. In this case, the first groove 221 and the third groove 223 are in the shape of ">" where two grooves 220 facing in different directions are arranged, for example, when viewed from the +z axis direction.

The second groove 222 and the fourth groove 224 may extend in a direction deviated from the y axis direction. For example, the second groove 222 and the fourth groove 224 may extend in a direction rotated from the y axis in the same direction of rotation around the z axis as the axis of rotation when viewed from the +z axis direction. In this case, the second groove 222 and the fourth groove 224 are in the shape of "//" where two grooves 220 are arranged obliquely, for example, when viewed from the +z axis direction. Further, the second groove 222 and the fourth groove 224 may extend in a direction rotated from the y axis in different directions of rotation. In this case, the second groove 222 and the fourth groove 224 are in the shape of ">" where two grooves 220 facing in different directions are arranged, for example, when viewed from the +z axis direction.

The direction in which the second groove 222 and the fourth groove 224 extend is not limited to a direction perpendicular to the direction in which the first groove 221 and the third groove 223 extend as long as it is a direction intersecting with the direction in which the first groove 221 and the third groove 223 extend.

The first groove 221 is disposed between the first receptacle region 241 and the second receptacle region 242. Thus, the first groove 221 divides the first receptacle region 241 and the second receptacle region 242. The first groove 221 divides the first receptacle region 241 from the second receptacle region 242. The second groove 222 is disposed between the second receptacle region 242 and the third receptacle region 243. Thus, the second groove 222 divides the second receptacle region 242 and the third receptacle region 243. The second groove 222 divides the second receptacle region 242 from the third receptacle region 243. The third groove 223 is disposed between the third receptacle region 243 and the fourth receptacle region 244. Thus, the third groove 223 divides the third receptacle region 243 and the fourth receptacle region 244. The third groove 223 divides the third receptacle region 243 from the fourth receptacle region 244. The fourth groove 224 is disposed between the first receptacle region 241 and the fourth receptacle region 244. Thus, the fourth groove 224 divides the first receptacle region 241 and the fourth receptacle region 244. The fourth groove 224 divides the first receptacle region 241 from the fourth receptacle region 244.

The first groove 221 and the third groove 223 are adjacent in the x axis direction. For example, the first groove 221 is disposed on the −x axis direction side of the third groove 223. The first groove 221 and the third groove 223 are arranged in the x axis direction with the second center region 249 interposed therebetween on the receptacle surface 217. The second groove 222 and the fourth groove 224 are adjacent in the y axis direction. For example, the second groove 222 is disposed on the +y axis direction side of the fourth groove 224. The second groove 222 and the fourth groove 224 are arranged in the y axis direction with the second center region 249 interposed therebetween on the receptacle surface 217.

Figure 8:
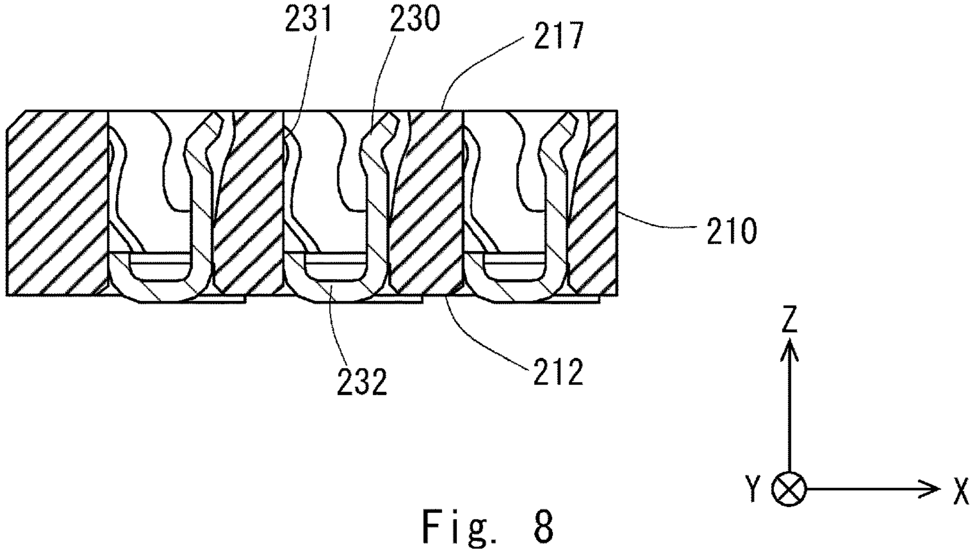
FIG. 8 is an enlarged cross-sectional view illustrating receptacle terminals of the receptacle in the connector according to the first embodiment.

FIG. 8 is an enlarged cross-sectional view illustrating the receptacle terminal 230 of the receptacle 200 in the connector 1 according to the first embodiment. As shown in FIGS. 2, 6 and 8, the receptacle surface 217 has a plurality of holes 231. Each receptacle terminal 230 is disposed inside each hole 231.

The plurality of receptacle terminals 230 are disposed inside the plurality of holes 231 formed in the receptacle surface 217, respectively. Each receptacle terminal 230 is disposed inside each hole 231. Each receptacle terminals 230 does not project from the receptacle surface 217 when viewed from the side. A distal end of each receptacle terminal 230 is located on the inner side of the hole 231 than an opening of the hole 231.

The receptacle terminals 230 may be in an L shape having a part extending in the z axis direction and a part extending in the x axis or y axis direction. A part of each receptacle terminal 230 extending in the x axis or y axis direction is thereby fixed to the receptacle main body 210. The receptacle terminals 230 preferably have springiness. The receptacle terminals 230 have higher elasticity than the plug terminals 130. Thus, the receptacle terminals 230 have higher springiness than the plug terminals 130. On the other hand, the plug terminals 130 have lower elasticity than the receptacle terminals 230.

For example, the part of the receptacle terminal 230 extending in the z axis direction has a part folded inward. The width of a part into which the plug terminal 130 is to be inserted is thereby smaller than the outside diameter of the plug terminal 130. Then, when the plug terminal 130 is inserted into the hole 231, the part of the receptacle terminal 230 extending in the z axis direction is curved outward. Further, the receptacle terminal 230 holds the plug terminal 130 so as to be in contact with the plug terminal 130 by springiness.

An end part 232 of the receptacle terminal 230 on the −z axis direction side may be exposed at the plate surface 212. The receptacle terminal 230 connects to the plug terminal 130 and thereby produces continuity with the plug terminal 130. In the figures, reference symbols of several receptacle terminals 230 and holes 231 are omitted to avoid the complexity of the figures.

The plurality of receptacle terminals 230 are disposed in the first receptacle region 241, the second receptacle region 242, the third receptacle region 243, and the fourth receptacle region 244. The plurality of receptacle terminals 230 may be arranged in a matrix in each region of the first receptacle region 241, the second receptacle region 242, the third receptacle region 243, and the fourth receptacle region 244. The plurality of receptacle terminals 230 may be arranged in a matrix in the x axis direction and the y axis direction, or arranged in a matrix in directions deviated from the x axis direction and the y axis direction in each region. Note that the arrangement of the receptacle terminals 230 in each region may be different from one another. The receptacle terminals 230 are not disposed in the second center region 249. Alternatively, the receptacle terminals 230 may be disposed in the second center region 249.

Figure 9:
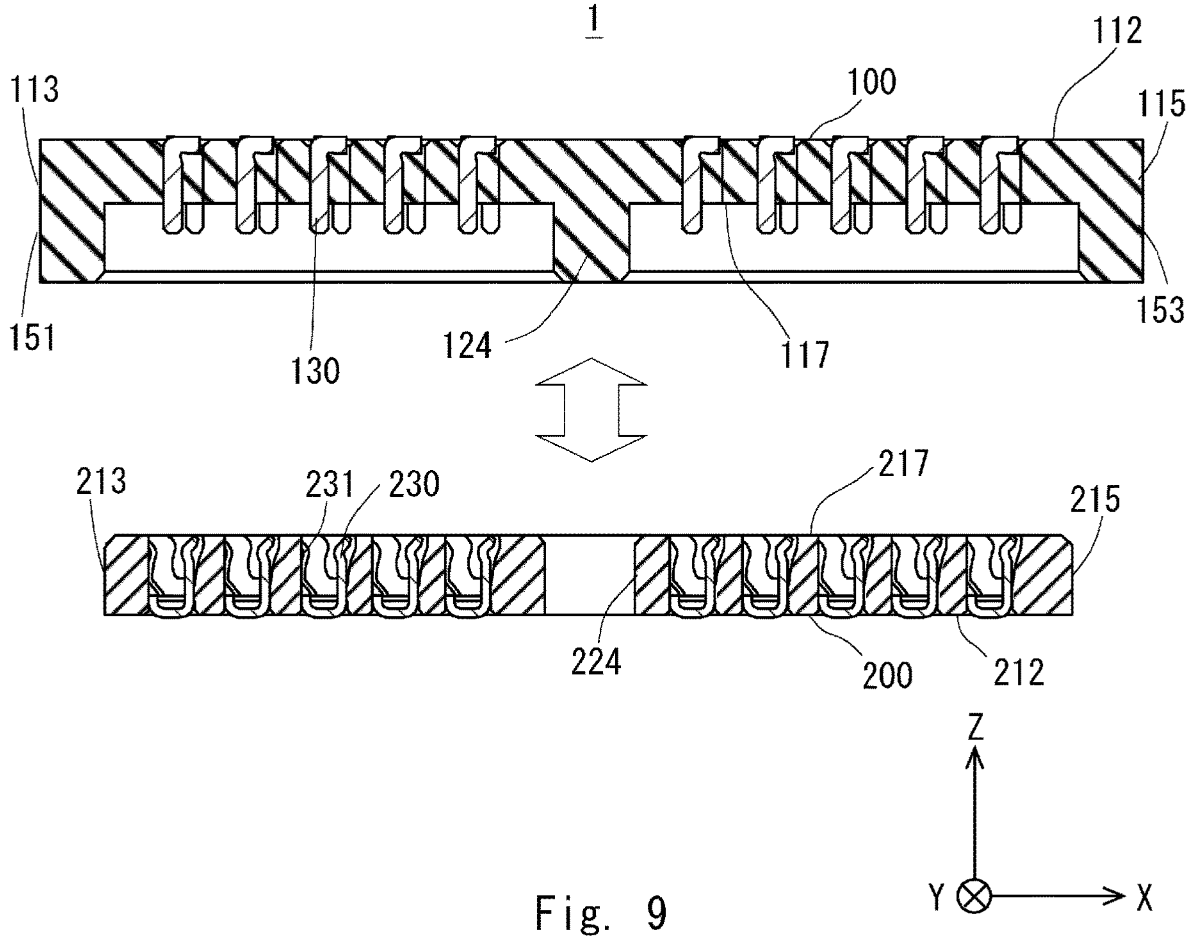
FIG. 9 is a cross-sectional view illustrating the state where the plug and the receptacle are opposed in the connector according to the first embodiment.

FIG. 9 is a cross-sectional view illustrating the state where the plug 100 and the receptacle 200 are opposed in the connector 1 according to the first embodiment. As shown in FIG. 9, when connecting the plug 100 and the receptacle 200, the plug surface 117 of the plug 100 and the receptacle surface 217 of the receptacle 200 are opposed to each other. Then, the first projecting part 121, the second projecting part 122, the third projecting part 123, and the fourth projecting part 124 are inserted into the first groove 221, the second groove 222, the third groove 223, and the fourth groove 224, respectively. In this case, the plug terminals 130 in the first plug region 141, the second plug region 142, the third plug region 143, and the fourth plug region 144 are connected to the receptacle terminals 230 in the first receptacle region 241, the second receptacle region 242, the third receptacle region 243, and the fourth receptacle region 244, respectively. The plug surface 117 and the receptacle surface 217 form a mating reference surface. In this manner, the plug 100 and the receptacle 200 are connected.

In the case where the plug 100 has the plug frame 150, when the first projecting part 121, the second projecting part 122, the third projecting part 123, and the fourth projecting part 124 are inserted into the first groove 221, the second groove 222, the third groove 223, and the fourth groove 224, respectively, the receptacle 200 is mated with an inside space surrounded by the plug frame 150. To be specific, the first frame part 151 comes into contact with the side surface 213 of the receptacle main body 210. The second frame part 152 comes into contact with the side surface 214 of the receptacle main body 210. The third frame part 153 comes into contact with the side surface 215 of the receptacle main body 210. The fourth frame part 154 comes into contact with the side surface 216 of the receptacle main body 210. This allows the connector 1 to be firmly connected.

Effects of this embodiment will be described hereinafter. The receptacle terminals 230 according to this embodiment are disposed inside the holes 231 formed in the receptacle surface 217. On the other hand, the projecting parts 120 of the plug 100 project higher than the plug terminals 130 from the plug surface 117. This prevents the plug terminals 130 and the receptacle terminals 230 from interfering with the plug main body 110 and the receptacle main body 210 on the other side and being broken down, and thereby enhances the connection reliability of the connector 1.

Figure 10:
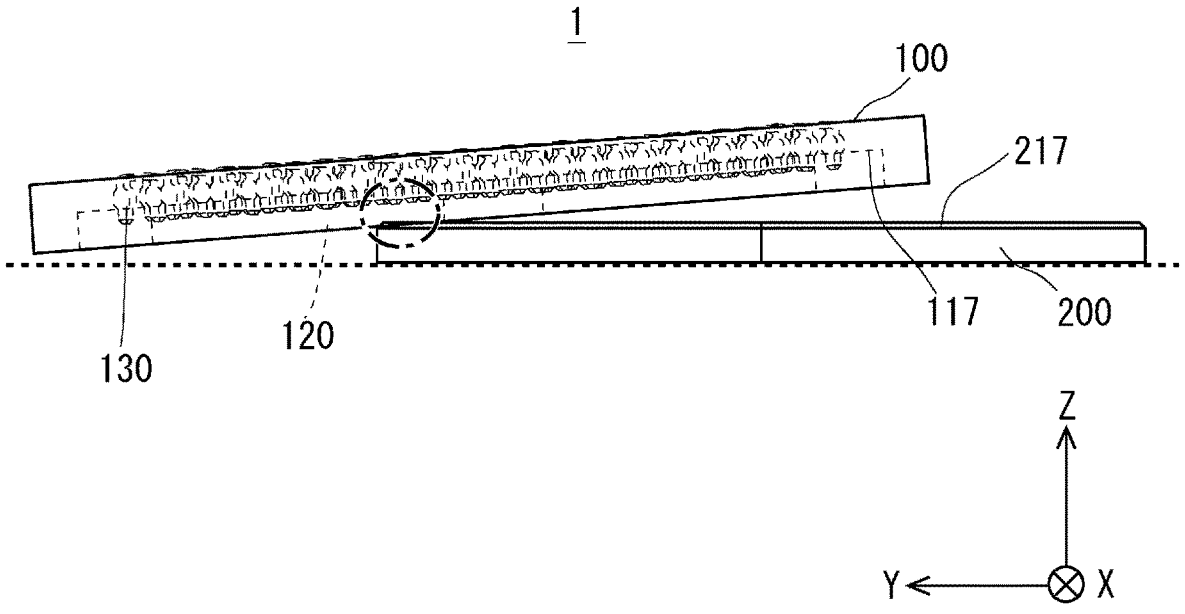
FIG. 10 is a view illustrating the state where a plug surface of the plug and a receptacle surface of the receptacle are out of alignment in the connector according to the first embodiment.

FIG. 10 is a view illustrating the state where the plug surface 117 of the plug 100 and the receptacle surface 217 of the receptacle 200 are out of alignment in the connector 1 according to the first embodiment. Hatching is omitted in the figure. As shown in FIG. 10, the connector 1 has the projecting parts 120 on the plug surface 117 of the plug 100. The height of the projecting parts 120 from the plug surface 117 is higher than the height of the plug terminals 130 from the plug surface 117. Thus, even when the plug surface 117 and the receptacle surface 217 are out of alignment, the projecting parts 120 come into contact with the receptacle surface 217. This prevents the plug terminals 130 from interfering with the receptacle surface 217, and thereby avoids the breakdown of the plug terminals 130.

Further, the projecting parts 120 include a plurality of projecting parts 120 extending in two directions: one direction and another direction intersecting with the one direction. This allows the plug terminals 130 to be protected even when the mating position is displaced in any direction.

Second Embodiment

Figure 11:
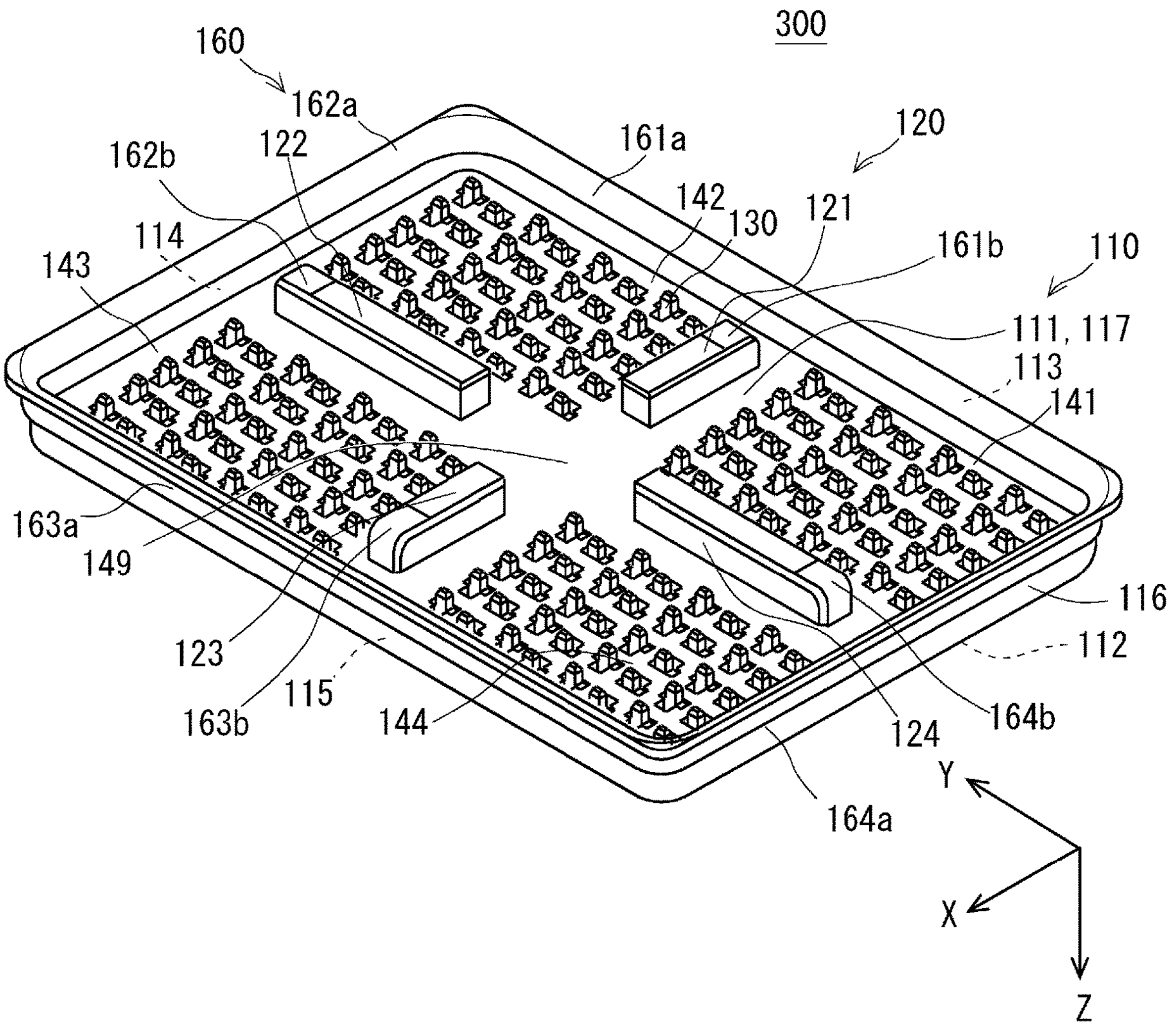
FIG. 11 is a perspective view illustrating a plug in a connector according to a second embodiment.
Figure 12:
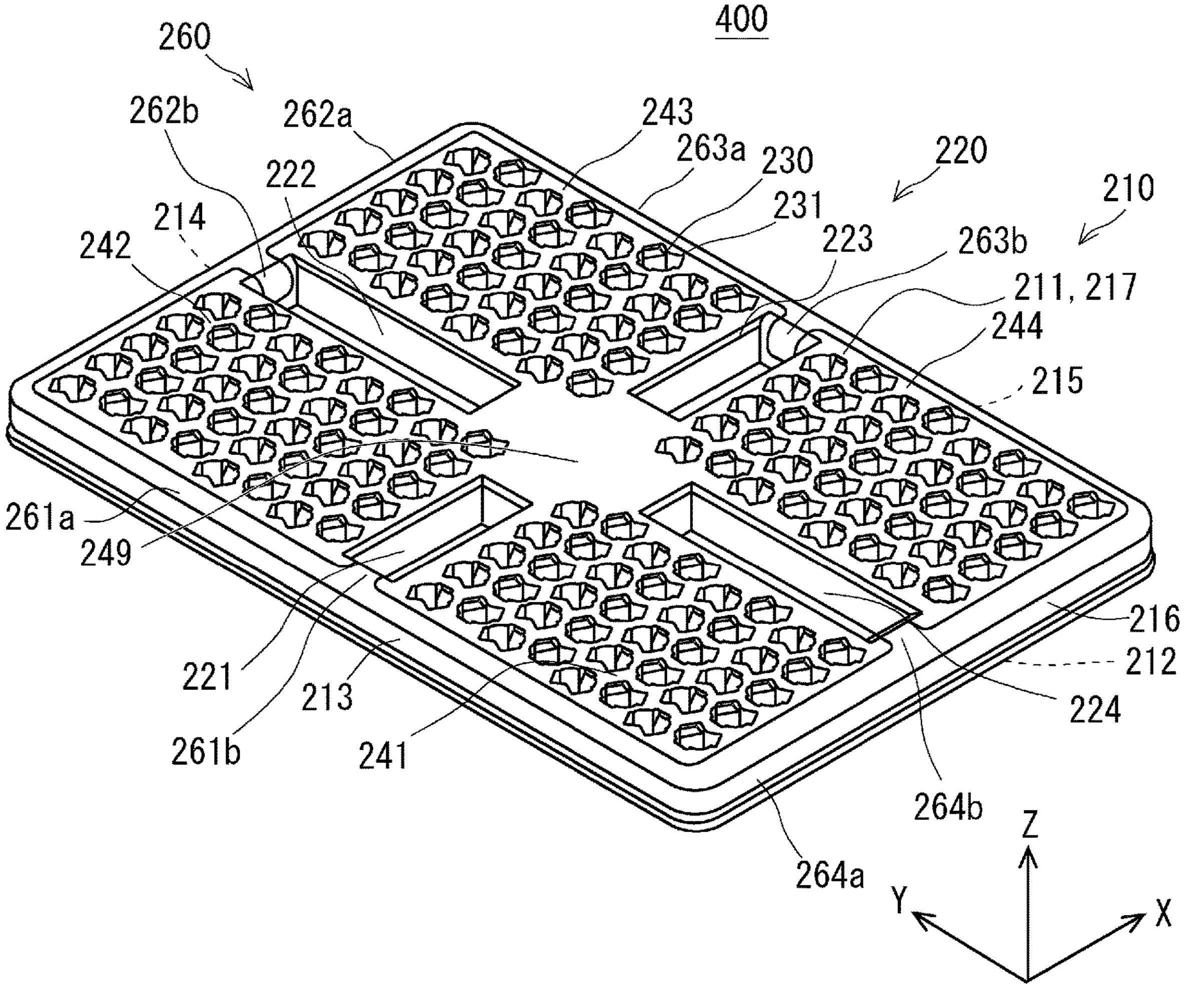
FIG. 12 is a perspective view illustrating a receptacle in the connector according to the second embodiment.
Figure 13:
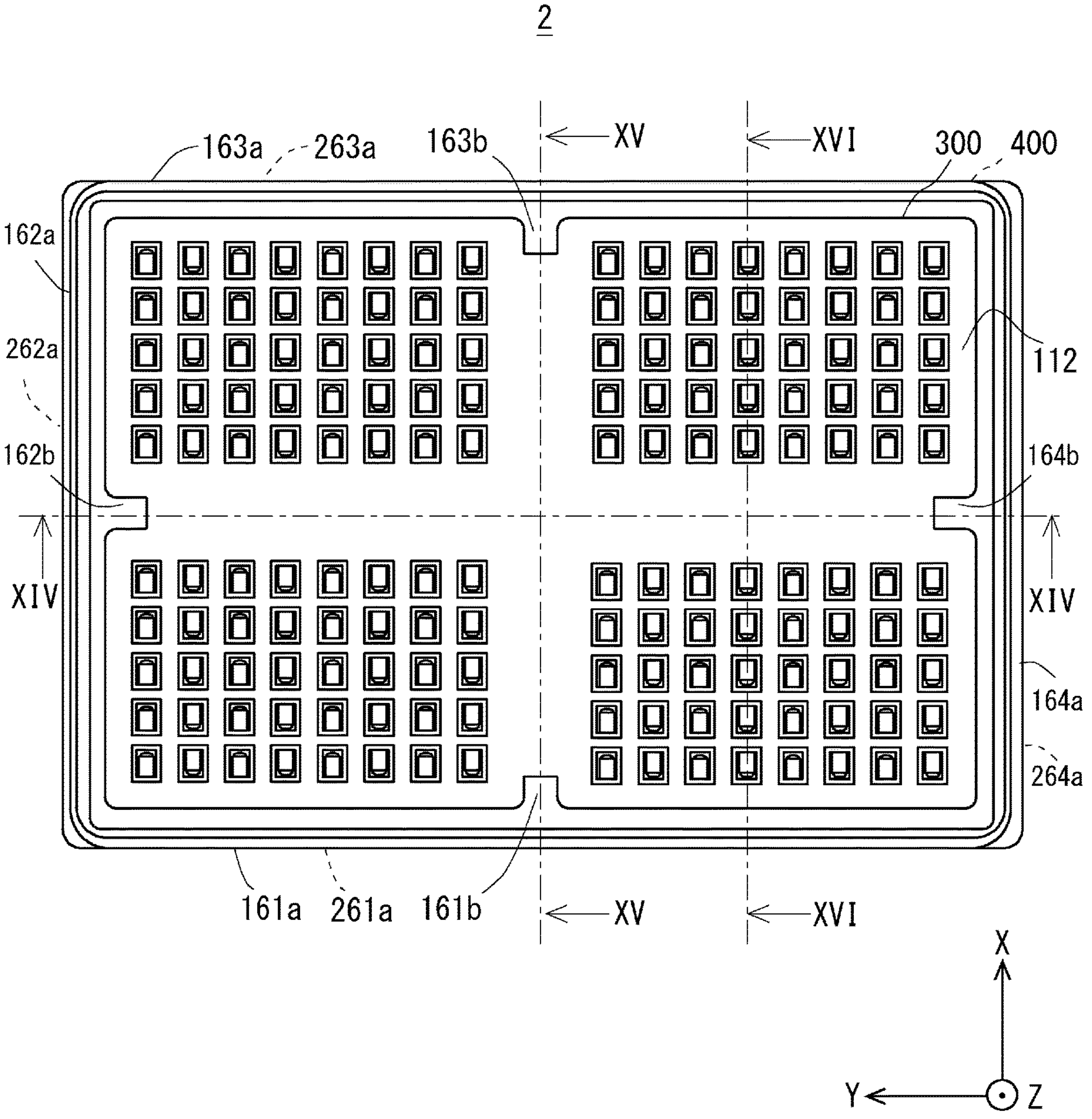
FIG. 13 is a top view illustrating the state where the plug and the receptacle are mated in the connector according to the second embodiment.
Figure 14:
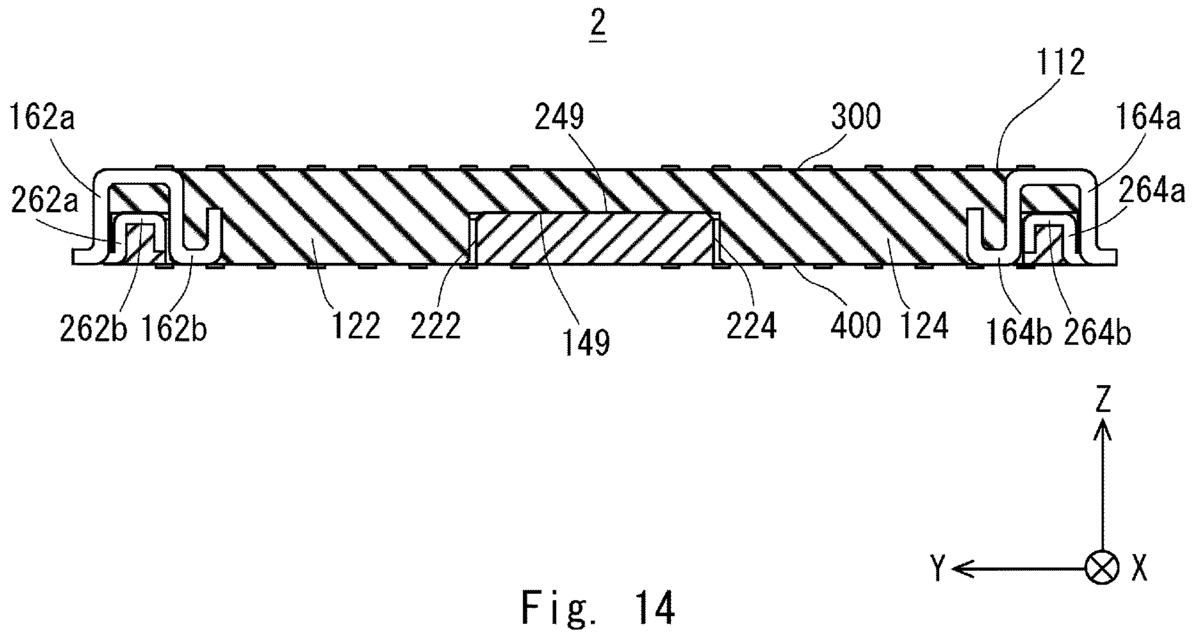
FIG. 14 is a cross-sectional view along line XIV-XIV in FIG. 13 illustrating the state where the plug and the receptacle are mated in the connector according to the second embodiment.
Figure 15:
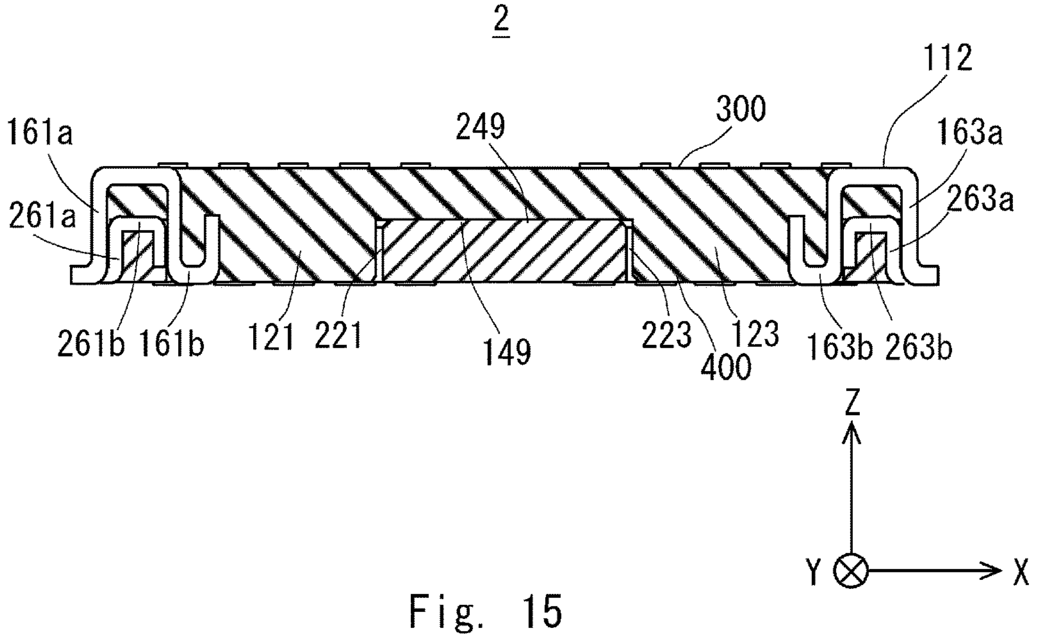
FIG. 15 is a cross-sectional view along line XV-XV in FIG. 13 illustrating the state where the plug and the receptacle are mated in the connector according to the second embodiment.
Figure 16:
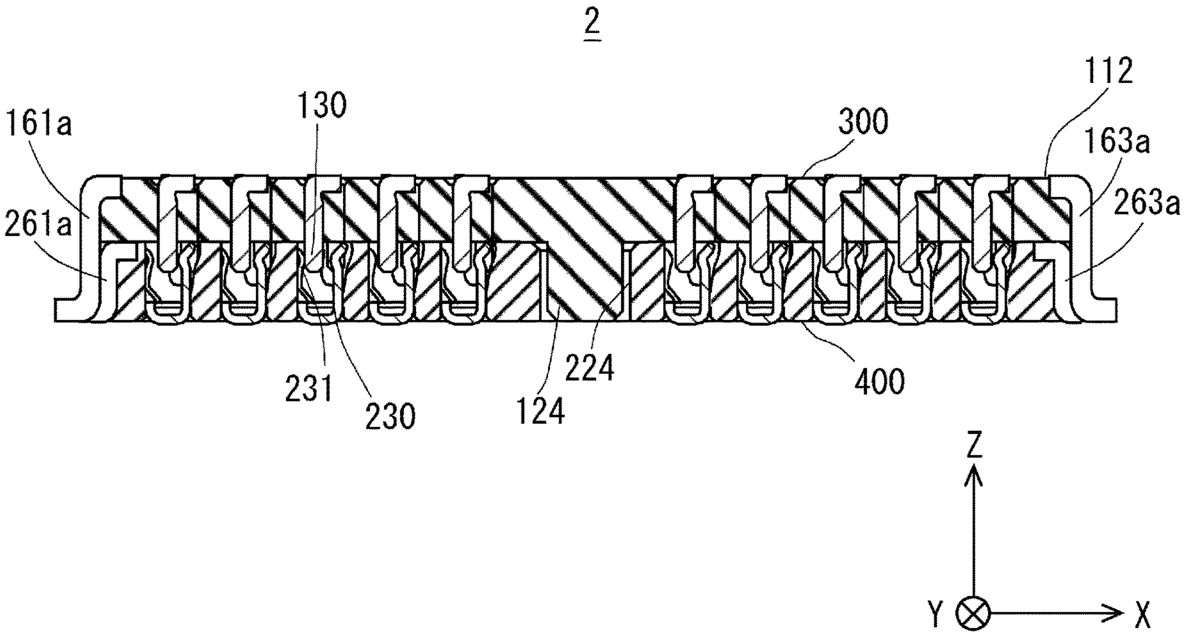
FIG. 16 is a cross-sectional view along line XVI-XVI in FIG. 13 illustrating the state where the plug and the receptacle are mated in the connector according to the second embodiment.
Figure 17:
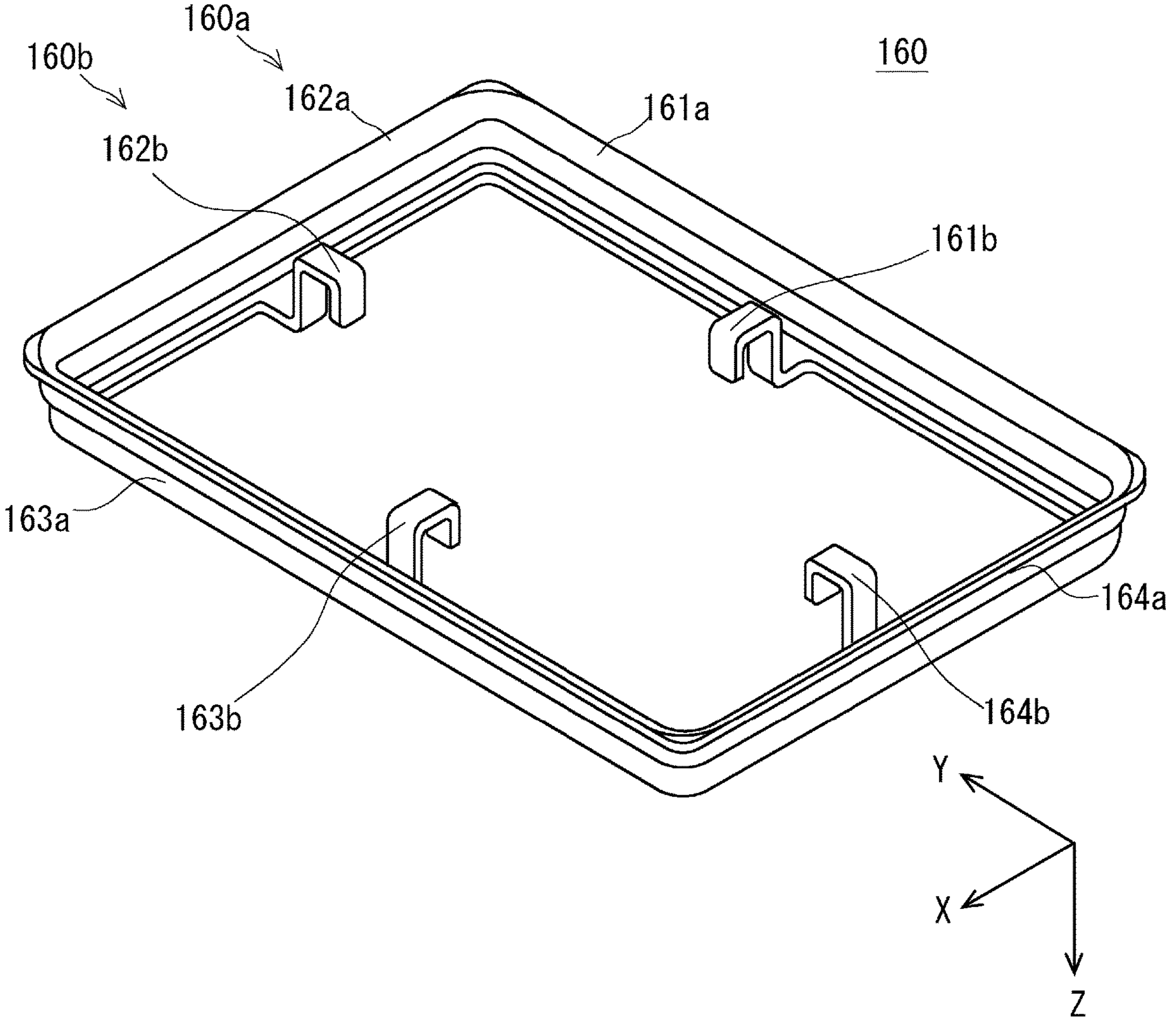
FIG. 17 is a perspective view illustrating a plug shell according to the second embodiment.
Figure 18:
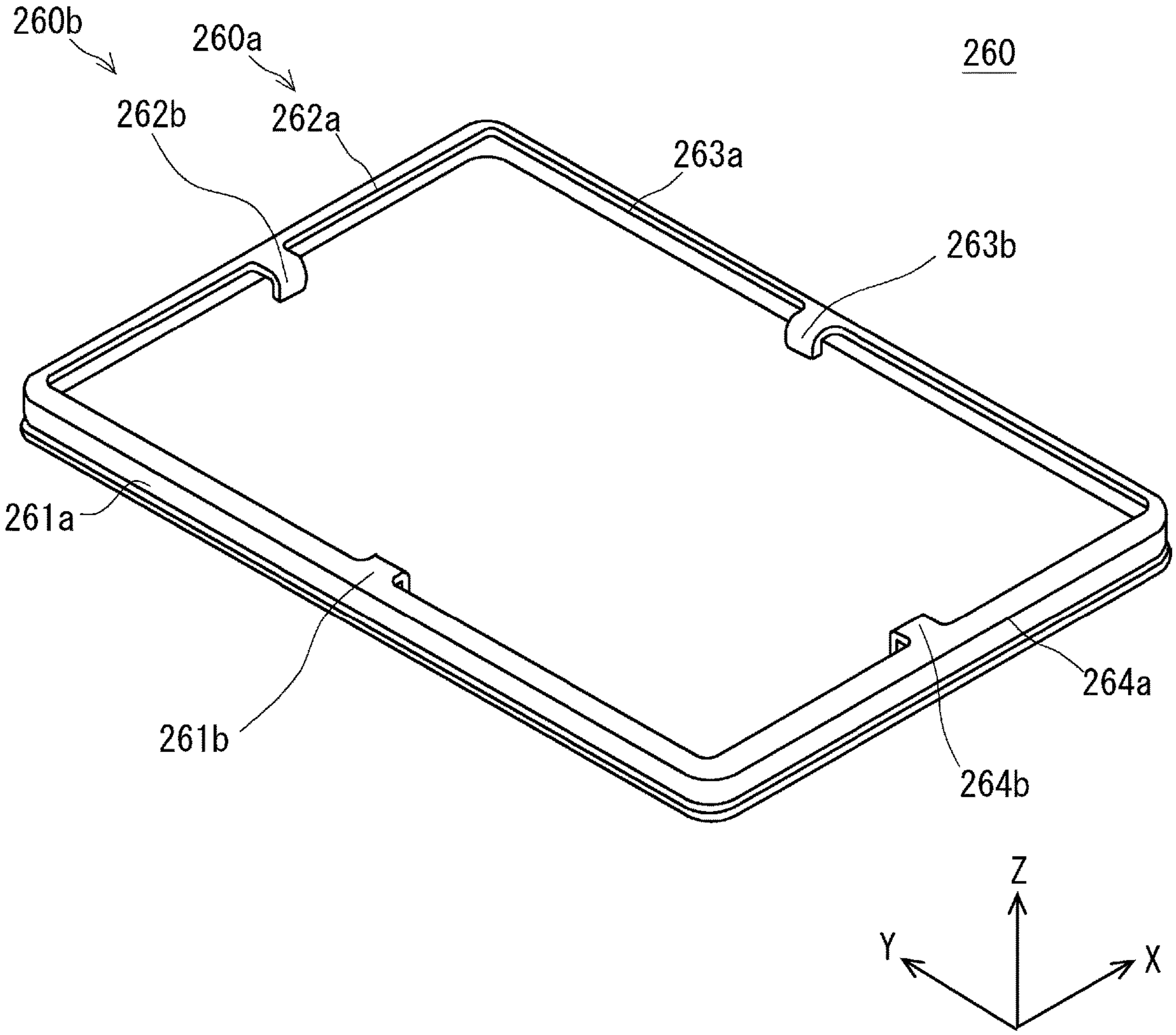
FIG. 18 is a perspective view illustrating a receptacle shell according to the second embodiment.

A connector according to a second embodiment will be described hereinafter. The connector according to this embodiment includes shells on side surfaces of a plug main body and a receptacle main body. FIG. 11 is a perspective view illustrating a plug in the connector according to the second embodiment. FIG. 12 is a perspective view illustrating a receptacle in the connector according to the second embodiment. FIG. 13 is a top view illustrating the state where the plug and the receptacle are mated in the connector according to the second embodiment. FIG. 14 is a cross-sectional view along line XIV-XIV in FIG. 13 illustrating the state where the plug and the receptacle are mated in the connector according to the second embodiment. FIG. 15 is a cross-sectional view along line XV-XV in FIG. 13 illustrating the state where the plug and the receptacle are mated in the connector according to the second embodiment. FIG. 16 is a cross-sectional view along line XVI-XVI in FIG. 13 illustrating the state where the plug and the receptacle are mated in the connector according to the second embodiment. FIG. 17 is a perspective view illustrating a plug shell according to the second embodiment. FIG. 18 is a perspective view illustrating a receptacle shell according to the second embodiment.

As shown in FIGS. 11 to 18, a connector 2 includes a plug 300 and a receptacle 400. The plug 300 includes a plug shell 160 in addition to the structure of the plug 100. Specifically, the plug 300 includes the plug main body 110, the plurality of projecting parts 120, the plurality of plug terminals 130, and the plug shell 160. The receptacle 400 includes a receptacle shell 260 in addition to the structure of the receptacle 200. Specifically, the receptacle 400 includes the receptacle main body 210, the plurality of receptacle terminals 230, and the receptacle shell 260.

As shown in FIG. 17, the plug shell 160 is roughly in a rectangular frame shape. The plug shell 160 contains metal as a material. Note that the plug shell 160 may contain an insulator such as resin as a material. The plug shell 160 includes a shell part 160*a* and a reinforcement part 160*b*.

The shell part 160*a* covers the side surfaces 113 to 116 of the plug main body 110. The shell part 160*a* projects from the plug surface 117. To be specific, a part of the shell part 160*a* on the −z axis direction side projects from the plug surface 117. The shell part 160*a* surrounds the first plug region 141, the second plug region 142, the third plug region 143, and the fourth plug region 144.

The shell part 160*a* includes a first shell part 161*a*, a second shell part 162*a*, a third shell part 163*a*, and a fourth shell part 164*a*. The first shell part 161*a* and the third shell part 163*a* extend in the y axis direction, for example. The second shell part 162*a* and the fourth shell part 164*a* extend in the x axis direction, for example. The height of each shell part 161*a* to 164*a* from the plug surface 117, i.e., the length of a part of each shell part 161*a* to 164*a* projecting from the plug surface 117 in the z axis direction, is preferably the same.

The length of each shell part 161*a* to 164*a* projecting from the plug surface 117 is longer than the length of the plug terminal 130 projecting from the plug surface 117. The length of each shell part 161*a* to 164*a* projecting from the plug surface 117 may be the same as the length of each projecting part 120 projecting from the plug surface 117.

The first shell part 161*a* covers the side surface 113 of the plug main body 110. Both ends of the first shell part 161*a* are connected to the second shell part 162*a* and the fourth shell part 164*a*, respectively. The second shell part 162*a* covers the side surface 114 of the plug main body 110. Both ends of the second shell part 162*a* are connected to the first shell part 161*a* and the third shell part 163*a*, respectively. The third shell part 163*a* covers the side surface 115 of the plug main body 110. Both ends of the third shell part 163*a* are connected to the second shell part 162*a* and the fourth shell part 164*a*, respectively. The fourth shell part 164*a* covers the side surface 116 of the plug main body 110. Both ends of the fourth shell part 164*a* are connected to the first shell part 161*a* and the third shell part 163*a*, respectively.

The reinforcement part 160*b* includes a first projecting reinforcement part 161*b*, a second projecting reinforcement part 162*b*, a third projecting reinforcement part 163*b*, and a fourth projecting reinforcement part 164*b*. The first projecting reinforcement part 161*b*, the second projecting reinforcement part 162*b*, the third projecting reinforcement part 163*b*, and the fourth projecting reinforcement part 164*b* are connected to the center part of the first shell part 161*a*, the second shell part 162*a*, the third shell part 163*a*, and the fourth shell part 164*a*, respectively. In other words, the shell part 160*a* is connected to the first projecting reinforcement part 161*b*, the second projecting reinforcement part 162*b*, the third projecting reinforcement part 163*b*, and the fourth projecting reinforcement part 164*b*.

As shown in FIGS. 14 to 16, the cross-sections of the first projecting reinforcement part 161*b*, the second projecting reinforcement part 162*b*, the third projecting reinforcement part 163*b*, and the fourth projecting reinforcement part 164*b* have an S-shaped part, for example. Each of the first projecting reinforcement part 161*b*, the second projecting reinforcement part 162*b*, the third projecting reinforcement part 163*b*, and the fourth projecting reinforcement part 164*b* covers one end part of each projecting part 120.

The first projecting reinforcement part 161*b* is formed in the first projecting part 121. To be specific, the first projecting reinforcement part 161*b* coverts a part on the −x axis direction side of a surface on the −z axis direction side of the first projecting part 121 and an end face on the −x axis direction side of the first projecting part 121. Further, the first projecting reinforcement part 161*b* joins the above-described part that covers the first projecting part 121 and the first shell part 161*a*.

The second projecting reinforcement part 162*b* is formed in the second projecting part 122. The second projecting reinforcement part 162*b* coverts a part on the +y axis direction side of a surface on the −z axis direction side of the second projecting part 122 and an end face on the +y axis direction side of the second projecting part 122. Further, the second projecting reinforcement part 162*b* joins the above-described part that covers the second projecting part 122 and the second shell part 162*a*.

The third projecting reinforcement part 163*b* is formed in the third projecting part 123. The third projecting reinforcement part 163*b* coverts a part on the +x axis direction side of a surface on the −z axis direction side of the third projecting part 123 and an end face on the +x axis direction side of the third projecting part 123. Further, the third projecting reinforcement part 163*b* joins the above-described part that covers the third projecting part 123 and the third shell part 163*a*.

The fourth projecting reinforcement part 164*b* is formed in the fourth projecting part 124. The fourth projecting reinforcement part 164*b* coverts a part on the −y axis direction side of a surface on the −z axis direction side of the fourth projecting part 124 and an end face on the −y axis direction side of the fourth projecting part 124. Further, the fourth projecting reinforcement part 164*b* joins the above-described part that covers the fourth projecting part 124 and the fourth shell part 164*a*.

As shown in FIG. 18, the receptacle shell 260 is roughly in a rectangular frame shape. The receptacle shell 260 contains metal as a material. Note that the receptacle shell 260 may contain an insulator such as resin as a material. The receptacle shell 260 includes a shell part 260*a* and a reinforcement part 260*b*.

The shell part 260*a* covers the side surfaces 213 to 216 of the receptacle main body 210. An end part of the shell part 260*a* on the −z axis direction side does not project from the receptacle surface 217. Thus, the shell part 260*a* does not project in the −z axis direction from the receptacle surface 217.

The shell part 260*a* includes a first shell part 261*a*, a second shell part 262*a*, a third shell part 263*a*, and a fourth shell part 264*a*. The first shell part 261*a* and the third shell part 263*a* extend in the y axis direction, for example. The second shell part 262*a* and the fourth shell part 264*a* extend in the x axis direction, for example.

The first shell part 261*a* covers the side surface 213 of the receptacle main body 210. Both ends of the first shell part 261*a* are connected to the second shell part 262*a* and the fourth shell part 264*a*, respectively. The second shell part 262*a* covers the side surface 214 of the receptacle main body 210. Both ends of the second shell part 262*a* are connected to the first shell part 261*a* and the third shell part 263*a*, respectively. The third shell part 263*a* covers the side surface 215 of the receptacle main body 210. Both ends of the third shell part 263*a* are connected to the second shell part 262*a* and the fourth shell part 264*a*, respectively. The fourth shell part 264*a* covers the side surface 216 of the receptacle main body 210. Both ends of the fourth shell part 264*a* are connected to the first shell part 261*a* and the third shell part 263*a*, respectively.

The reinforcement part 260*b* includes a first groove reinforcement part 261*b*, a second groove reinforcement part 262*b*, a third groove reinforcement part 263*b*, and a fourth groove reinforcement part 264*b*. The first groove reinforcement part 261*b*, the second groove reinforcement part 262*b*, the third groove reinforcement part 263*b*, and the fourth groove reinforcement part 264*b* are connected to the center part of the first shell part 261*a*, the second shell part 262*a*, the third shell part 263*a*, and the fourth shell part 264*a*, respectively. In other words, the shell part 260*a* is connected to the first groove reinforcement part 261*b*, the second groove reinforcement part 262*b*, the third groove reinforcement part 263*b*, and the fourth groove reinforcement part 264*b*.

As shown in FIGS. 14 to 16, the cross-sections of the first groove reinforcement part 261*b*, the second groove reinforcement part 262*b*, the third groove reinforcement part 263*b*, and the fourth groove reinforcement part 264*b* have a U-shaped part, for example. Each of the first groove reinforcement part 261*b*, the second groove reinforcement part 262*b*, the third groove reinforcement part 263*b*, and the fourth groove reinforcement part 264*b* covers one inner wall of each groove 220.

The first groove reinforcement part 261*b* is formed on an inner wall of the first groove 221. The first groove reinforcement part 261*b* coverts the inner wall of the first groove 221 on the −x axis direction side. Further, the first groove reinforcement part 261*b* joins the above-described part that covers the inner wall of the first groove 221 and the first shell part 261*a*.

The second groove reinforcement part 262*b* is formed on an inner wall of the second groove 222. The second groove reinforcement part 262*b* coverts the inner wall of the second groove 222 on the +y axis direction side. Further, the second groove reinforcement part 262*b* joins the above-described part that covers the inner wall of the second groove 222 and the second shell part 262*a*.

The third groove reinforcement part 263*b* is formed on an inner wall of the third groove 223. The third groove reinforcement part 263*b* coverts the inner wall of the third groove 223 on the +x axis direction side. Further, the third groove reinforcement part 263*b* joins the above-described part that covers the inner wall of the third groove 223 and the third shell part 263*a*.

The fourth groove reinforcement part 264*b* is formed on an inner wall of the fourth groove 224. The fourth groove reinforcement part 264*b* coverts the inner wall of the fourth groove 224 on the −y axis direction side. Further, the fourth groove reinforcement part 264*b* joins the above-described part that covers the inner wall of the fourth groove 224 and the fourth shell part 264*a*.

In the connector 2 according to this embodiment, when the first projecting part 121, the second projecting part 122, the third projecting part 123, and the fourth projecting part 124 are inserted into the first groove 221, the second groove 222, the third groove 223, and the fourth groove 224, respectively, the first projecting reinforcement part 161*b*, the second projecting reinforcement part 162*b*, the third projecting reinforcement part 163*b*, and the fourth projecting reinforcement part 164*b* are opposed to the first groove reinforcement part 261*b*, the second groove reinforcement part 262*b*, the third groove reinforcement part 263*b*, and the fourth groove reinforcement part 264*b*, respectively. For example, there may design clearance between each projecting reinforcement part and each groove reinforcement part. Note that, in the process of inserting the first projecting part 121, the second projecting part 122, the third projecting part 123, and the fourth projecting part 124 into the first groove 221, the second groove 222, the third groove 223, and the fourth groove 224, respectively, at least any one of the first projecting reinforcement part 161*b*, the second projecting reinforcement part 162*b*, the third projecting reinforcement part 163*b*, and the fourth projecting reinforcement part 164*b* may come into contact with any one of the first groove reinforcement part 261*b*, the second groove reinforcement part 262*b*, the third groove reinforcement part 263*b*, and the fourth groove reinforcement part 264*b*.

Further, when each projecting part 120 is inserted into each groove 220, the shell part 160*a* in the plug shell 160 comes into contact with the shell part 260*a* in the receptacle shell 260. To be specific, an outer periphery of the shell part 260*a* is mated with an inner periphery of a part of the shell part 160*a* projecting from the plug surface 117.

Effects of this embodiment will be described hereinafter. The connector 2 according to this embodiment includes the plug shell 160 and the receptacle shell 260. The shell part 160*a* of the plug shell 160 covers the side surfaces 113 to 116 of the plug main body 110. The shell part 260*a* of the receptacle shell 260 covers the side surfaces 213 to 216 of the receptacle main body 210. When mating the plug 300 with the receptacle 400, the shell part 160*a* and the shell part 260*a* come into contact with each other. Thus, the plug shell 160 and the receptacle shell 260 prevent damage from occurring in the plug main body 110 and the receptacle main body 210 due to contact during mating.

Further, when mating the plug 300 with the receptacle 400, each projecting part 120 is mated with each groove 220. In this case, each reinforcement part 160*b* of the plug shell 160 can come into contact with each reinforcement part 260*b* of the receptacle shell 260 in some cases. Thus, each reinforcement part 160*b* and each reinforcement part 260*b* prevent damage from occurring in each projecting part 120 and each groove 220 due to contact during mating. The other structures and effects are contained in the description of the first embodiment.

Third Embodiment

Figure 19:
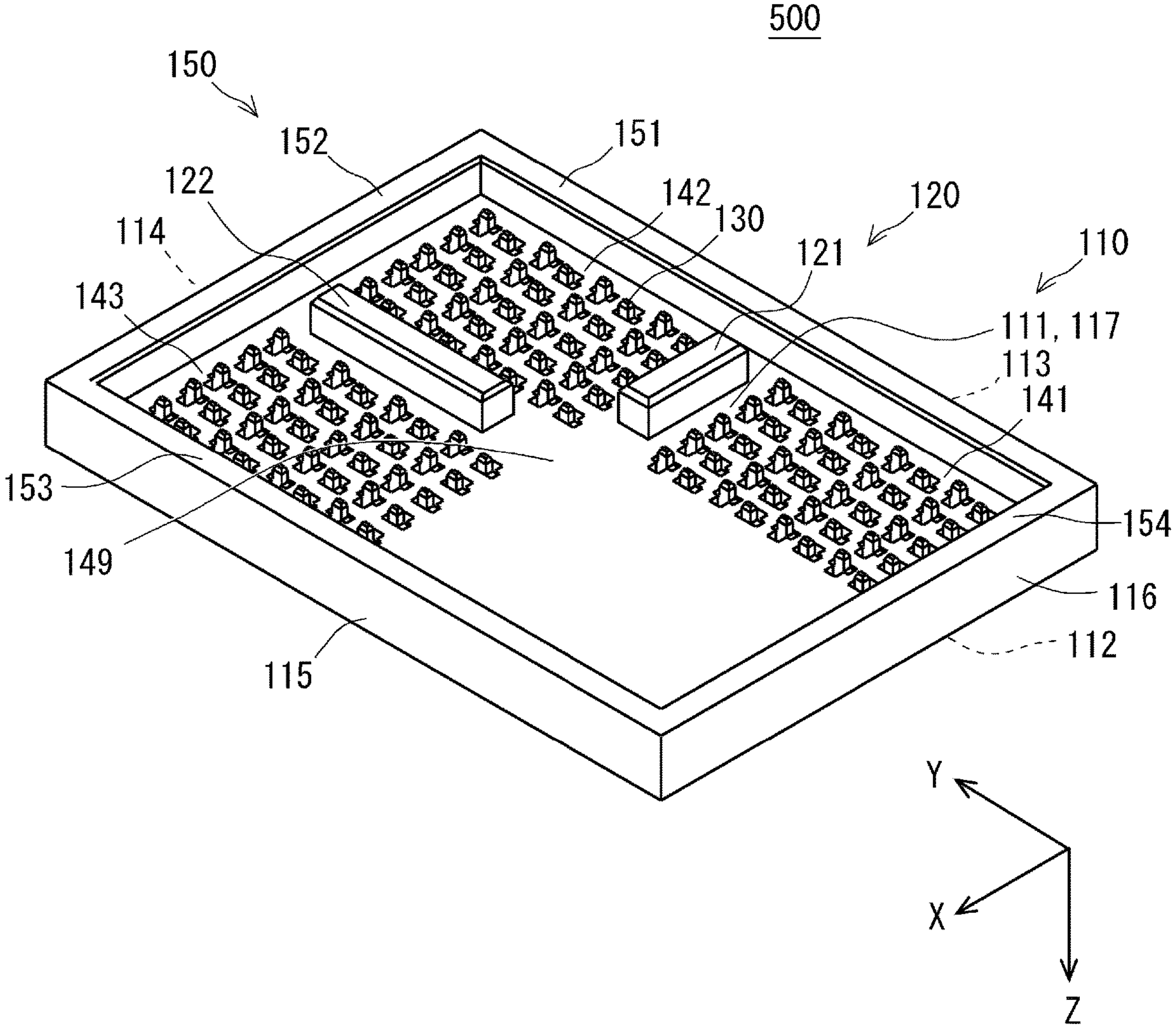
FIG. 19 is a perspective view illustrating a plug in a connector according to a third embodiment.
Figure 20:
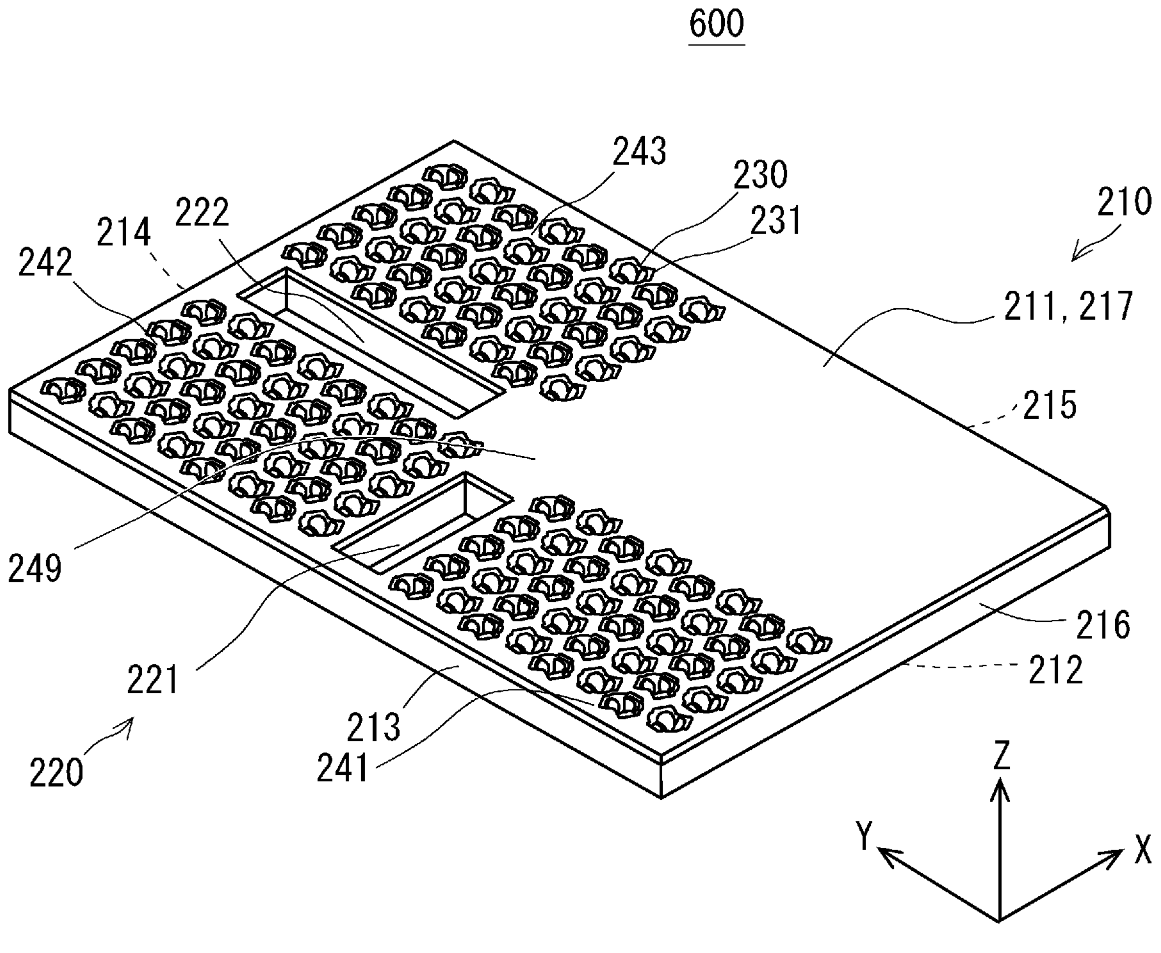
FIG. 20 is a perspective view illustrating a receptacle in the connector according to the third embodiment.
Figure 21:
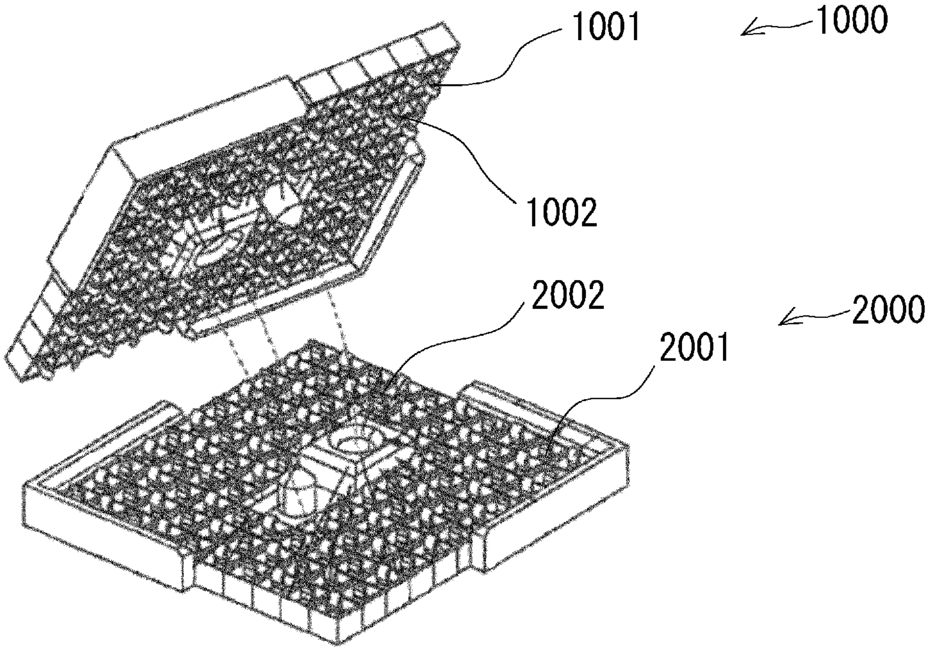
FIG. 21 is a perspective view illustrating a connector according to a related art.

A third embodiment will be described hereinafter. In this embodiment, the number of projecting parts 120 and grooves 220 is reduced. FIG. 19 is a perspective view illustrating a plug in a connector 3 according to the third embodiment. FIG. 20 is a perspective view illustrating a receptacle in the connector according to the third embodiment.

As shown in FIGS. 19 and 20, the connector 3 according to this embodiment includes a plug 500 and a receptacle 600. The plug 500 includes a plug main body 110, a plurality of projecting parts 120, and a plurality of plug terminals 130. The plug main body 110 has a plug surface 117 in a flat plate shape including a first plug region 141, a second plug region 142, and a third plug region 143. The plurality of projecting parts 120 include a first projecting part 121 and a second projecting part 122 projecting from the plug surface 117. The first projecting part 121 divides the first plug region 141 and the second plug region 142. The second projecting part 122 divides the second plug region 142 and the third plug region 143.

The receptacle 600 includes a receptacle main body 210 and a plurality of receptacle terminals 230. The receptacle main body 210 has a receptacle surface 217 in a flat plate shape including a first receptacle region 241, a second receptacle region 242, and a third receptacle region 243, and the receptacle surface 217 has a first groove 221 and a second groove 222. The first groove 221 divides the first receptacle region 241 and the second receptacle region 242. The second groove 222 divides the second receptacle region 242 and the third receptacle region 243.

When the first projecting part 121 and the second projecting part 122 are inserted into the first groove 221 and the second groove 222, respectively, the plug terminals 130 in the first plug region 141, the second plug region 142, and the third plug region 143 are connected to the receptacle terminals 230 in the first receptacle region 241, the second receptacle region 242, and the third receptacle region 243, respectively.

The plug surface 117 may further include a first center region 149. In this case, the first projecting part 121 may be arranged in line with the first center region 149 on the plug surface 117, and the second projecting part 122 may be arranged in line with the first center region 149 on the plug surface 117. The receptacle surface 217 may further include a second center region 249. In this case, the first groove 221 may be arranged in line the second center region 249 on the receptacle surface 217, and the second groove 222 may be arranged in line the second center region 249 on the receptacle surface 217.

The plug 500 may further include a plug frame 150 projecting from the plug surface 117 and surrounding the first plug region 141, the second plug region 142, and the third plug region 143. In this case, when the first projecting part 121 and the second projecting part 122 are inserted into the first groove 221 and the second groove 222, respectively, the receptacle 600 is mated with an inside space surrounded by the plug frame 150. The plug frame 150 is in a rectangular frame shape, and it may include a first frame part 151, a second frame part 152, a third frame part 153, and a fourth frame part 154. The first frame part 151 and the third frame part 153 may extend in another direction intersecting with one direction on the plug surface 117. The second frame part 152 and the fourth frame part 154 may extend in the one direction on the plug surface 117.

The plug 500 may further include a plug shell 160. The plug shell 160 may include a first projecting reinforcement part **161*b* formed in the first projecting part 121, a second projecting reinforcement part 162*b* formed in the second projecting part 122, and a shell part 160*a* that covers the side surfaces 113 to 116 of the plug main body 110, projects from the plug surface 117, surrounds the first plug region 141, the second plug region 142, and the third plug region 143, and is connected to the first projecting reinforcement part 161*b* and the second projecting reinforcement part 162*b***.

The receptacle 600 may further include a receptacle shell 260. The receptacle shell 260 may include a first groove reinforcement part **261*b* formed on an inner wall of the first groove 221, a second groove reinforcement part 262*b* formed on an inner wall of the second groove 222, and a shell part 260*a* that covers the side surfaces 213 to 216 of the receptacle main body 210 and is connected to the first groove reinforcement part 261*b* and the second groove reinforcement part 262*b***.

When the first projecting part 121 and the second projecting part 122 are inserted into the first groove 221 and the second groove 222, respectively, the first projecting reinforcement part **161*b* and the second projecting reinforcement part 162*b* are opposed to the first groove reinforcement part 261*b* and the second groove reinforcement part 262*b*. Note that, in the process of inserting the first projecting part 121 and the second projecting part 122 into the first groove 221 and the second groove 222, respectively, at least any one of the first projecting reinforcement part 161*b* and the second projecting reinforcement part 162*b* may come into contact with any one of the first groove reinforcement part 261*b* and the second groove reinforcement part 262*b*. The shell part 160*a* in the plug shell 160 comes into contact with the shell part 260*a* in the receptacle shell 260**.

According to this embodiment, even when the number of the projecting parts 120 in the plug 500 and the grooves 220 in the receptacle 600 is reduced, interference and breakdown of the plug terminals 130 and the receptacle terminals 230 with the plug main body 110 and the receptacle main body 210 on the other side are prevented, which enhances the connection reliability of the connector 1. The other structures and effects are contained in the description of the first and second embodiments.

Although embodiments of the present disclosure are described in the foregoing, the present disclosure involves appropriate modifications without impairment of its object and effects and is not restricted to the above-described embodiments. The structures in the first to third embodiments may be combined as appropriate.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A connector comprising:
a plug; and
a receptacle, wherein
the plug includes
a plug main body having a plug surface in a flat plate shape including a first plug region, a second plug region, and a third plug region,
a plurality of projecting parts including a first projecting part and a second projecting part projecting from the plug surface, and
a plurality of plug terminals projecting lower than the projecting parts from the plug surface,
the receptacle includes
a receptacle main body having a receptacle surface in a flat plate shape including a first receptacle region, a second receptacle region, and a third receptacle region, where a first groove and a second groove are formed on the receptacle surface, and
a plurality of receptacle terminals respectively disposed inside a plurality of holes formed on the receptacle surface,
the first projecting part divides the first plug region and the second plug region,
the second projecting part divides the second plug region and the third plug region,
the first groove divides the first receptacle region and the second receptacle region,
the second groove divides the second receptacle region and the third receptacle region, and
when the first projecting part and the second projecting part are inserted into the first groove and the second groove, respectively, plug terminals in the first plug region, the second plug region, and the third plug region are connected to receptacle terminals in the first receptacle region, the second receptacle region, and the third receptacle region.

2. The connector according to claim 1, wherein
the plug surface further includes a fourth plug region,
the plurality of projecting parts further include a third projecting part and a fourth projecting part projecting from the plug surface,
the receptacle surface further includes a fourth receptacle region,
a third groove and a fourth groove are further formed in the receptacle main body,
the third projecting part divides the third plug region and the fourth plug region,
the fourth projecting part divides the first plug region and the fourth plug region,
the third groove divides the third receptacle region and the fourth receptacle region,
the fourth groove divides the first receptacle region and the fourth receptacle region, and
when the third projecting part and the fourth projecting part are further inserted into the third groove and the fourth groove, respectively, plug terminals in the fourth plug region are connected to receptacle terminals in the fourth receptacle region.

3. The connector according to claim 2, wherein
the first projecting part and the third projecting part extend in one direction on the plug surface, the second projecting part and the fourth projecting part extend in another direction intersecting with the one direction on the plug surface, and when the receptacle surface and the plug surface are opposed to each other, the first groove and the third groove extend in the one direction on the receptacle surface, and the second groove and the fourth groove extend in the another direction on the receptacle surface.

4. The connector according to claim 2, wherein the plug surface further includes a first center region, the first projecting part and the third projecting part are arranged in line with the first center region interposed therebetween on the plug surface, the second projecting part and the fourth projecting part are arranged in line with the first center region interposed therebetween on the plug surface, the receptacle surface further includes a second center region, the first groove and the third groove are arranged in line with the second center region interposed therebetween on the receptacle surface, and the second groove and the fourth groove are arranged in line with the second center region interposed therebetween on the receptacle surface.

5. The connector according to claim 1, wherein the plug terminals have lower elasticity than the receptacle terminals, and distal ends of the receptacle terminals are located inside the holes.

6. The connector according to claim 2, wherein the plug further includes a plug frame projecting from the plug surface and surrounding the first plug region, the second plug region, the third plug region, and the fourth plug region, and when the first projecting part, the second projecting part, the third projecting part, and the fourth projecting part are inserted into the first groove, the second groove, the third groove, and the fourth groove, respectively, the receptacle is mated with an inside space surrounded by the plug frame.

7. The connector according to claim 6, wherein the plug frame is in a rectangular frame shape and includes a first frame part, a second frame part, a third frame part, and a fourth frame part, the first frame part and the third frame part extend in another direction intersecting with one direction on the plug surface, and the second frame part and the fourth frame part extend in the one direction on the plug surface.

8. The connector according to claim 2, wherein the plug further includes a plug shell, the plug shell including:

a first projecting reinforcement part formed in the first projecting part, a second projecting reinforcement part formed in the second projecting part, a third projecting reinforcement part formed in the third projecting part, a fourth projecting reinforcement part formed in the fourth projecting part, and a shell part covering side surfaces of the plug main body, projecting from the plug surface, surrounding the first plug region, the second plug region, the third plug region and the fourth plug region, and connected to the first projecting reinforcement part, the second projecting reinforcement part, the third projecting reinforcement part, and the fourth projecting reinforcement part, the receptacle further includes a receptacle shell, the receptacle shell including:

a first groove reinforcement part formed on an inner wall of the first groove, a second groove reinforcement part formed on an inner wall of the second groove, a third groove reinforcement part formed on an inner wall of the third groove, a fourth groove reinforcement part formed on an inner wall of the fourth groove, and a shell part covering side surfaces of the receptacle main body and connected to the first groove reinforcement part, the second groove reinforcement part, the third groove reinforcement part, and the fourth groove reinforcement part, and when the first projecting part, the second projecting part, the third projecting part and the fourth projecting part are inserted into the first groove, the second groove, the third groove and the fourth groove, respectively, the first projecting reinforcement part, the second projecting reinforcement part, the third projecting reinforcement part, and the fourth projecting reinforcement part are opposed to the first groove reinforcement part, the second groove reinforcement part, the third groove reinforcement part, and the fourth groove reinforcement part, and the shell part in the plug shell comes into contact with the shell part in the receptacle shell.

9. The connector according to claim 1, wherein the first projecting part extends in one direction on the plug surface, the second projecting part extends in another direction intersecting with the one direction on the plug surface, and when the receptacle surface and the plug surface are opposed to each other, the first groove extends in the one direction on the receptacle surface, and the second groove extends in the another direction on the receptacle surface.

10. The connector according to claim 1, wherein the plug surface further includes a first center region, the first projecting part is arranged in line with the first center region on the plug surface, the second projecting part is arranged in line with the first center region on the plug surface, the receptacle surface further includes a second center region, the first groove is arranged in line with the second center region on the receptacle surface, and the second groove is arranged in line with the second center region on the receptacle surface.

11. The connector according to claim 1, wherein the plug further includes a plug frame projecting from the plug surface and surrounding the first plug region, the second plug region, and the third plug region, and when the first projecting part and the second projecting part are inserted into the first groove and the second groove, respectively, the receptacle is mated with an inside space surrounded by the plug frame.

12. The connector according to claim 11, wherein the plug frame is in a rectangular frame shape and includes a first frame part, a second frame part, a third frame part, and a fourth frame part, the first frame part and the third frame part extend in another direction intersecting with one direction on the plug surface, and the second frame part and the fourth frame part extend in the one direction on the plug surface.

13. The connector according to claim 1, wherein the plug further includes a plug shell, the plug shell including:

a first projecting reinforcement part formed in the first projecting part, a second projecting reinforcement part formed in the second projecting part, and a shell part covering side surfaces of the plug main body, projecting from the plug surface, surrounding the first plug region, the second plug region, and the third plug region, and connected to the first projecting reinforcement part and the second projecting reinforcement part, the receptacle further includes a receptacle shell, the receptacle shell including:

a first groove reinforcement part formed on an inner wall of the first groove, a second groove reinforcement part formed on an inner wall of the second groove, and a shell part covering side surfaces of the receptacle main body, and connected to the first groove reinforcement part and the second groove reinforcement part, and when the first projecting part and the second projecting part are inserted into the first groove and the second groove, respectively, the first projecting reinforcement part and the second projecting reinforcement part are opposed to the first groove reinforcement part and the second groove reinforcement part, and the shell part in the plug shell comes into contact with the shell part in the receptacle shell.

* * * * *